US012543844B2

(12) United States Patent
Brown et al.

(10) Patent No.: US 12,543,844 B2
(45) Date of Patent: Feb. 10, 2026

(54) HANDLE AND FITMENT ASSEMBLY

(71) Applicant: THE CLOROX COMPANY, Oakland, CA (US)

(72) Inventors: Stefan Brown, Pleasanton, CA (US); Benjamin Ma, Pleasanton, CA (US); Russell E. Bell, Pleasanton, CA (US); Laura E. Barts, Pleasanton, CA (US)

(73) Assignee: The Clorox Company, Oakland, CA (US)

( * ) Notice: Subject to any disclaimer, the term of this patent is extended or adjusted under 35 U.S.C. 154(b) by 1241 days.

(21) Appl. No.: 17/156,361

(22) Filed: Jan. 22, 2021

(65) Prior Publication Data

US 2022/0232960 A1 Jul. 28, 2022

(51) Int. Cl.

| | |
|---|---|
| ***A46B 5/00*** | (2006.01) |
| ***A46B 9/00*** | (2006.01) |
| ***A47K 17/00*** | (2006.01) |
| ***B25G 3/12*** | (2006.01) |

(52) U.S. Cl.
CPC .......... *A46B 5/0095* (2013.01); *A46B 5/0091* (2013.01); *A46B 9/005* (2013.01); *A47K 17/00* (2013.01); *B25G 3/12* (2013.01); *A46B 2200/01* (2013.01); *A46B 2200/304* (2013.01)

(58) Field of Classification Search
CPC ... A46B 5/0054; A46B 5/0087; A46B 5/0091; A46B 5/0095; A46B 5/002; A46B 2200/01; A46B 2200/304; A47K 17/00; B25G 3/38
See application file for complete search history.

(56) References Cited

U.S. PATENT DOCUMENTS 1,124,073 A * 1/1915 Sullivan .................. A47L 13/42 403/66
1,779,057 A * 10/1930 Tolmach .................. A46B 7/06 403/68
2,428,306 A 9/1947 Beagle
2,752,625 A 7/1956 Ponsell
2,764,774 A * 10/1956 Belsky .................. A47L 13/257 15/228
3,214,779 A * 11/1965 Wheeler ................ A47K 11/10 15/244.2
3,256,075 A 6/1966 Robert et al.
4,457,038 A 7/1984 Hammond
4,466,152 A 8/1984 Moss et al.
(Continued)

FOREIGN PATENT DOCUMENTS

EP 0313495 A1 4/1989
EP 1254950 A2 11/2002
(Continued)

OTHER PUBLICATIONS

U.S. Appl. No. 17/157,181, filed Jan. 25, 2021, Stefan Brown.
(Continued)

*Primary Examiner* — Monica S Carter
(74) *Attorney, Agent, or Firm* — Harness, Dickey & Pierce, P.L.C.

(57) ABSTRACT

Disclosed is a cleaning assembly. The cleaning assembly may include multiple portions, such as a handle portion and a cleaning portion. The cleaning assembly may include a disposable head portion that may be engaged and disengaged from the handle assembly.

17 Claims, 18 Drawing Sheets

(56) References Cited

U.S. PATENT DOCUMENTS

| | | | |
|---|---|---|---|
| 4,493,124 A | 1/1985 | Agapiou | |
| 4,642,836 A | 2/1987 | Bokmiller | |
| 4,663,796 A | 5/1987 | Helling et al. | |
| 4,796,325 A * | 1/1989 | Bortman | A46B 5/0075 15/172 |
| 4,852,201 A | 8/1989 | Wundrock et al. | |
| 4,987,634 A | 1/1991 | Weihrauch | |
| 5,381,809 A | 1/1995 | Parker, Jr. | |
| 5,407,594 A | 4/1995 | Fry et al. | |
| 5,410,771 A * | 5/1995 | Bereza | A47L 1/06 15/232 |
| 5,471,697 A | 12/1995 | Daconta | |
| 5,551,115 A * | 9/1996 | Newville | A47L 13/42 403/114 |
| 5,630,243 A | 5/1997 | Federico et al. | |
| 5,642,913 A | 7/1997 | Brown | |
| 5,658,874 A | 8/1997 | Davies et al. | |
| 5,842,810 A | 12/1998 | Morad | |
| 5,862,565 A | 1/1999 | Lundstedt | |
| 5,888,002 A | 3/1999 | Fenstersheib | |
| 5,941,379 A | 8/1999 | Barardo | |
| 5,945,076 A | 8/1999 | Leonard et al. | |
| D413,470 S | 9/1999 | Burton | |
| 6,094,771 A | 8/2000 | Egolf et al. | |
| 6,154,913 A | 12/2000 | Burton | |
| 6,191,100 B1 | 2/2001 | Askew et al. | |
| RE37,190 E | 5/2001 | Stowell et al. | |
| 6,295,688 B1 | 10/2001 | Sayles et al. | |
| 6,313,086 B1 | 11/2001 | Askew et al. | |
| 6,355,607 B1 | 3/2002 | Rahman et al. | |
| 6,405,403 B1 | 6/2002 | McKay | |
| 6,413,928 B1 | 7/2002 | Painter et al. | |
| 6,426,111 B1 | 7/2002 | Hirsch | |
| 6,523,213 B1 | 2/2003 | Post | |
| 6,611,986 B1 | 9/2003 | Seals | |
| D496,586 S | 9/2004 | Belser et al. | |
| D501,728 S | 2/2005 | Conway et al. | |
| D502,002 S | 2/2005 | Conway et al. | |
| D502,324 S | 3/2005 | Conway et al. | |
| D504,065 S | 4/2005 | Belser et al. | |
| 6,978,508 B2 | 12/2005 | Young | |
| D520,852 S | 5/2006 | Minkler et al. | |
| 7,059,008 B2 | 6/2006 | Morgan et al. | |
| 7,065,825 B2 | 6/2006 | Minkler et al. | |
| 7,127,768 B2 | 10/2006 | Blum et al. | |
| D532,564 S | 11/2006 | Neumann et al. | |
| 7,146,676 B2 | 12/2006 | Kubes et al. | |
| 7,159,265 B2 | 1/2007 | Soller et al. | |
| 7,213,706 B2 | 5/2007 | Belser et al. | |
| 7,275,276 B2 | 10/2007 | Jaszenovics et al. | |
| 7,316,046 B2 | 1/2008 | Michaels et al. | |
| 7,344,553 B2 | 3/2008 | Opolski et al. | |
| 7,386,910 B2 | 6/2008 | Minkler et al. | |
| 7,446,082 B2 | 11/2008 | Kilkenny et al. | |
| 7,470,652 B2 | 12/2008 | Kilkenny et al. | |
| 7,530,138 B1 | 5/2009 | Platt | |
| 7,533,437 B1 * | 5/2009 | Gartner | B05C 17/00 15/210.1 |
| 7,603,739 B2 | 10/2009 | Minkler et al. | |
| 8,015,653 B2 * | 9/2011 | Bargiel | A45D 34/04 15/210.1 |
| 8,286,295 B2 | 10/2012 | Minkler et al. | |
| 8,888,395 B1 | 11/2014 | Hinnant | |
| 9,021,649 B2 | 5/2015 | Minkler et al. | |
| 9,237,939 B2 | 1/2016 | Maurer et al. | |
| 9,655,482 B2 | 5/2017 | Michelson et al. | |
| 10,264,941 B2 * | 4/2019 | Koval | A47L 13/24 |
| 10,932,646 B2 * | 3/2021 | Weaver | A47L 13/38 |
| 11,253,127 B2 * | 2/2022 | Yan | A47L 11/282 |
| 2002/0007527 A1 | 1/2002 | Hart | |
| 2002/0032137 A1 | 3/2002 | DeSenna et al. | |
| 2002/0061831 A1 | 5/2002 | Kaziska et al. | |
| 2002/0083542 A1 | 7/2002 | Hart | |
| 2002/0173442 A1 | 11/2002 | Smith et al. | |
| 2004/0088808 A1 | 5/2004 | Vitantonio et al. | |
| 2004/0255418 A1 | 12/2004 | Minkler et al. | |
| 2005/0005378 A1 | 1/2005 | Soller et al. | |
| 2005/0055787 A1 | 3/2005 | Blum et al. | |
| 2005/0066465 A1 | 3/2005 | Minkler et al. | |
| 2005/0246849 A1 | 11/2005 | Minkler et al. | |
| 2007/0006412 A1 | 1/2007 | Soller et al. | |
| 2007/0094827 A1 | 5/2007 | Kilkenny et al. | |
| 2009/0152132 A1 | 6/2009 | Wang | |
| 2009/0159487 A1 | 6/2009 | Tacoma | |
| 2012/0216831 A1 | 8/2012 | Cobabe et al. | |
| 2014/0157535 A1 | 6/2014 | Minkler et al. | |
| 2018/0132678 A1 | 5/2018 | Farrow et al. | |
| 2020/0163447 A1 | 5/2020 | Spitaletta | |
| 2021/0052117 A1 | 2/2021 | O'Brien et al. | |
| 2021/0137325 A1 | 5/2021 | Hersey | |
| 2022/0232960 A1 | 7/2022 | Brown et al. | |
| 2022/0233035 A1 | 7/2022 | Brown et al. | |

FOREIGN PATENT DOCUMENTS

| | | | |
|---|---|---|---|
| EP | 1254950 | A3 | 5/2003 |
| JP | 09135728 | A | 5/1997 |
| JP | 10295610 | A2 | 11/1998 |
| JP | H10295610 | A | 11/1998 |
| WO | WO8700411 | A1 | 1/1987 |
| WO | 0034422 | A2 | 6/2000 |
| WO | WO0034422 | A3 | 6/2000 |
| WO | WO0071012 | A1 | 11/2000 |
| WO | WO0115587 | A1 | 3/2001 |
| WO | WO0126499 | A1 | 4/2001 |
| WO | WO0130954 | A1 | 5/2001 |
| WO | WO0143618 | A1 | 6/2001 |
| WO | WO0149818 | A1 | 7/2001 |
| WO | 2005006933 | A2 | 1/2005 |
| WO | WO2005006933 | A3 | 1/2005 |
| WO | 2020251464 | A1 | 12/2020 |

OTHER PUBLICATIONS

U.S. Appl. No. 17/590,646, filed Feb. 1, 2022, Keith Alsberg.

International Search Report and Written Opinion regarding International Patent Application No. PCT/US2023/011939, dated Apr. 12, 2023.

International Preliminary Report on Patentability regarding International Patent Application No. PCT/US2023/011939, dated Aug. 6, 2024, 10 pages.

Requisition received by the Canadian Intellectual Property Office for Canadian Application No. 3,216,886 dated Feb. 17, 2025, 6 pages.

Requisition received by the Canadian Intellectual Property Office for Canadian Application No. 3,216,886 dated Aug. 20, 2025, 4 pages.

* cited by examiner

IFig-19

HANDLE AND FITMENT ASSEMBLY

FIELD

The subject disclosure relates to an assembly, in particular to a handle and head assembly having an attachment region between a connector and a fitment and a mechanism for engaging and disengaging the fitment from the connector.

BACKGROUND

This section provides background information related to the present disclosure which is not necessarily prior art.

Various items may generally be selected to be cleaned and/or sanitized after a selected period of time. For example, a toilet bowl may include a receptacle or bowl area that may become soiled after one or more uses. The soiled bowl may be cleaned with a selected device.

Generally, a cleaning device for a soiled bowl of a toilet assembly may include a scrubbing portion and a holding portion. Generally, the scrubbing portion is fixed to the holding portion and must be inserted and removed from the toilet bowl during and after use. Therefore, the scrubbing portion may generally include a portion of the material removed from the bowl that may be cleaned therefrom and/or desired to be cleaned therefrom.

SUMMARY

This section provides a general summary of the disclosure, and is not a comprehensive disclosure of its full scope or all of its features.

Disclosed herein is an assembly that allows for cleaning of various items, such as a toilet bowl. The assembly may include a handle portion and a removable and/or disposable head or scrubbing portion. Generally, the head portion may be releasably attached to the handle.

The handle may include a mechanism to engage or disengage the head portion. The head portion may, therefore, be selectively attached to the handle portion for use. After use, the head portion may be releasably detached from the handle portion for various reasons. Therefore, the head portion need not be retained for later uses and any soil on the head portion may be disposed of in a permanent and sanitary manner.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
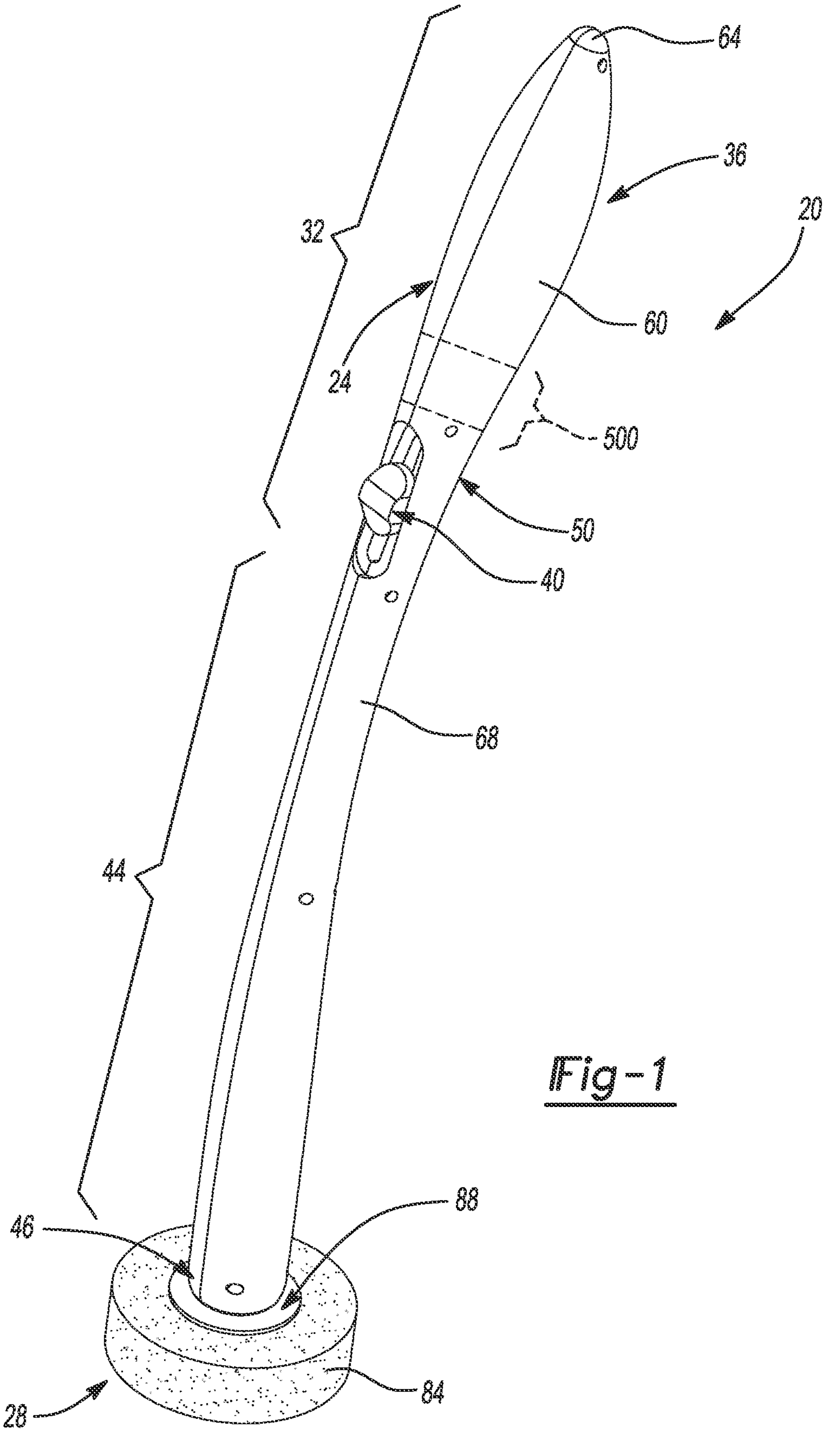
FIG. 1 is a perspective view of a handle and head assembly.
Figure 2:
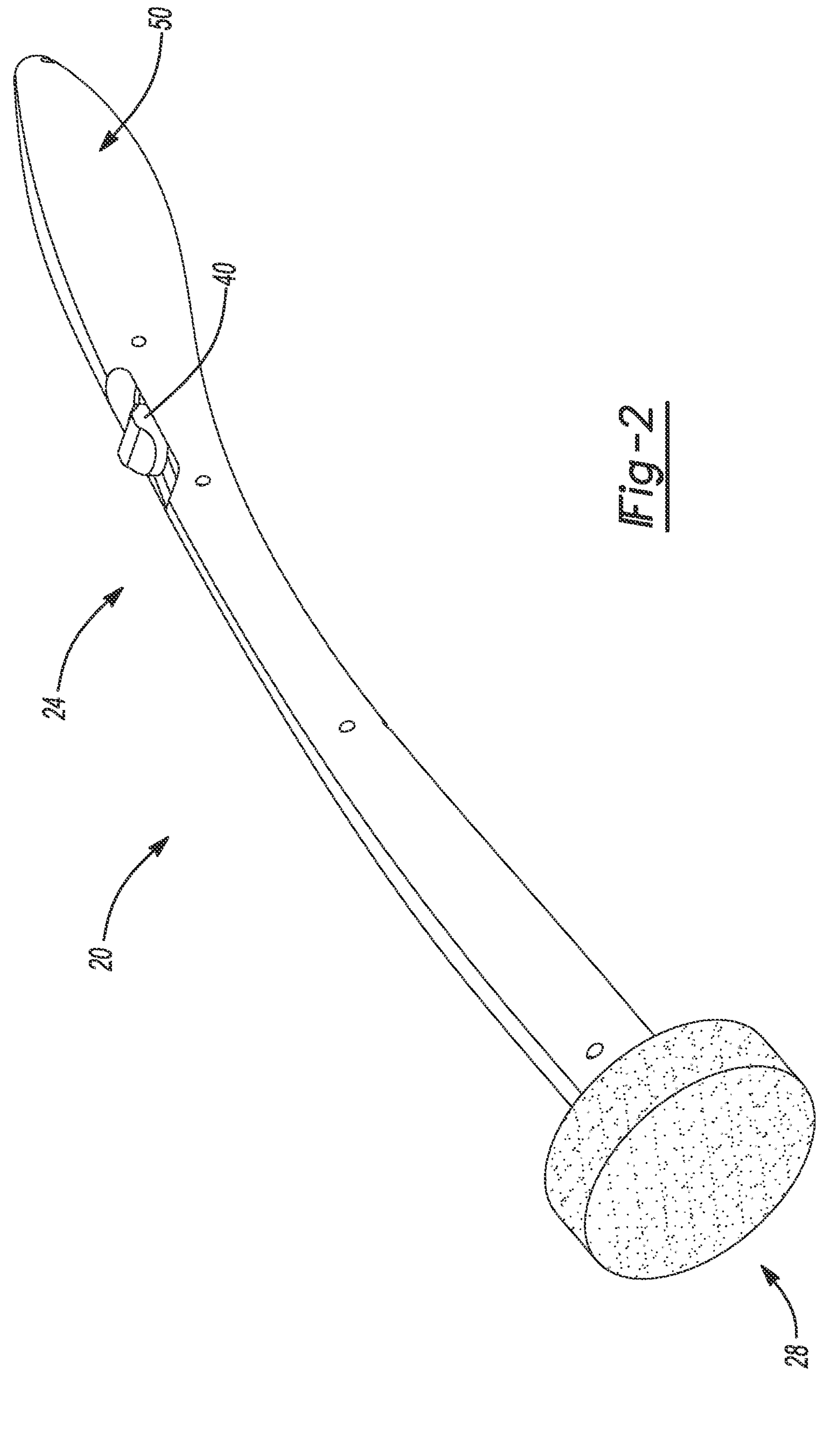
FIG. 2 is a bottom perspective view of the handle and head assembly of FIG. 1.
Figure 3:
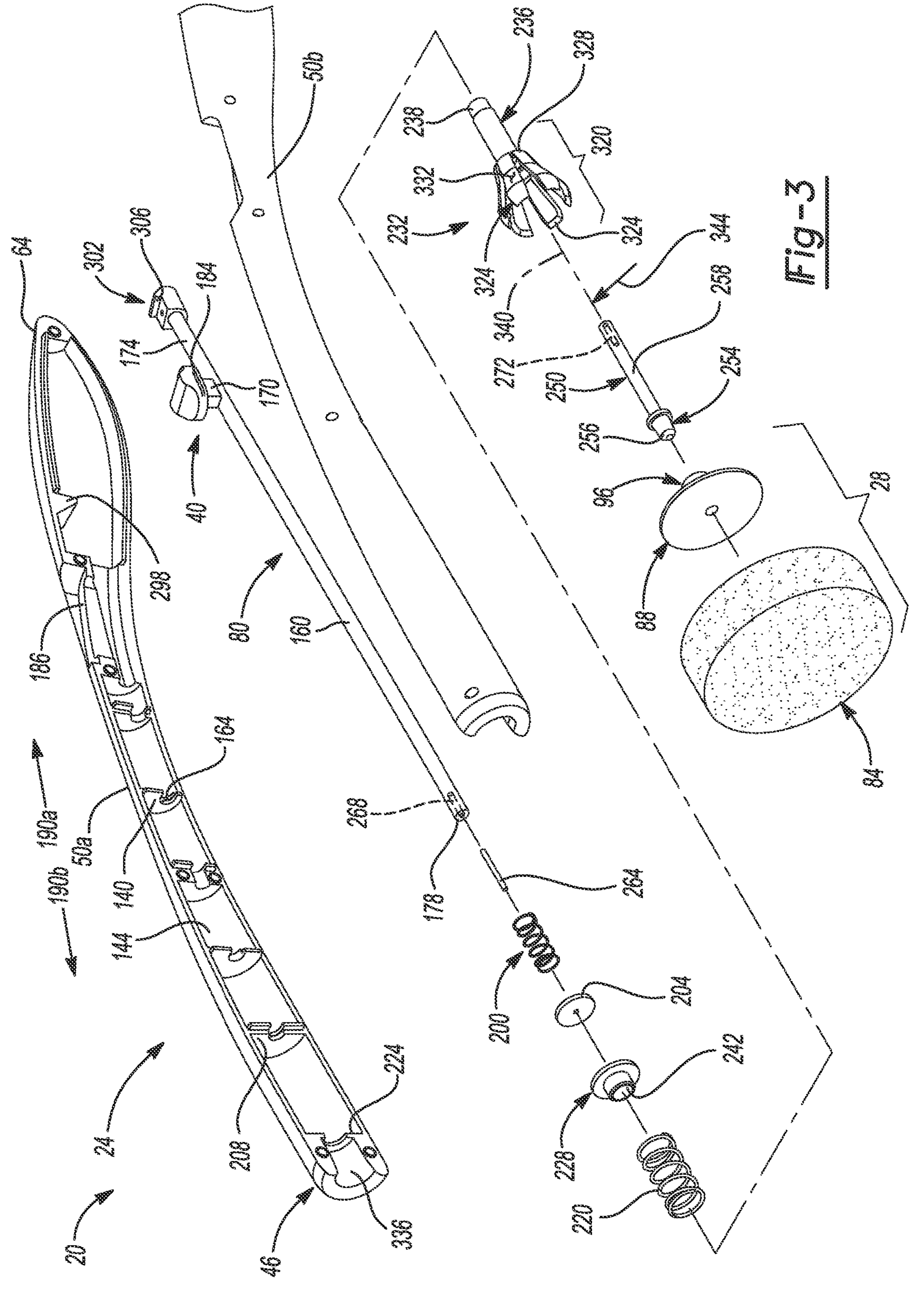
FIG. 3 is a partial exploded view of the handle from the head of the handle and head assembly of FIG. 1.

With initial reference to FIGS. 1, 2, and 3, a cleaning assembly or cleaning tool assembly 20 is illustrated. The cleaning assembly 20 may also be referred to as a toilet cleaning system, a cleansing system, and/or a cleaning tool assembly, etc. The cleaning assembly 20 may include a handle (which may also be referred to as a handle portion or region and/or wand region or portion 24 and a head portion 28. The wand portion 24 may be formed as an elongated handle and/or a handle assembly and may include various features or portions, such as a proximal portion or region 32 that may generally include a holding portion 36 that is configured to be grasped or manipulated for use of the cleaning assembly 20. The proximal portion 32 may also include various control mechanisms, such as a control switch or slide 40, as discussed further herein. The handle 24 may further include a distal portion 44 that may include a head engaging or contacting portion or region 46, as discussed further herein.

The handle 24 may generally include a substantially rigid outer or external wall 50. The wall 50 may extend along the proximal region 32 and the distal region 44. In various embodiments, the wall 50 may include one or more members that are assembled together to form the wand or handle 24. In various embodiments, for example, the wall 50 may be formed as two portions that are assembled together, as discussed further herein, in a clamshell manner. Nevertheless, the cleaning assembly 20 may include the handle or wand portion 24 that may be selectively engaged to the head or cleaning portion 28, as also discussed further herein.

With continuing reference to FIGS. 1-3, and additional reference to FIGS. 4, 5, 6, 7, 8, 9, and 10, the handle assembly portion 24 is illustrated. In various embodiments, the graspable or grasping portion 36 may include a selected geometry or contour that has a tapered geometry or configuration from a middle region or portion 60 to a distal end 64. Further, the grasping region 36 may taper toward the engaging end 46. The handle 24 may include a narrow waist or central region or portion 68 to which the graspable region 36 tapers. The handle portion 24 may again taper out or expand as it extends toward the distal or engaging end 46.

Figure 6:
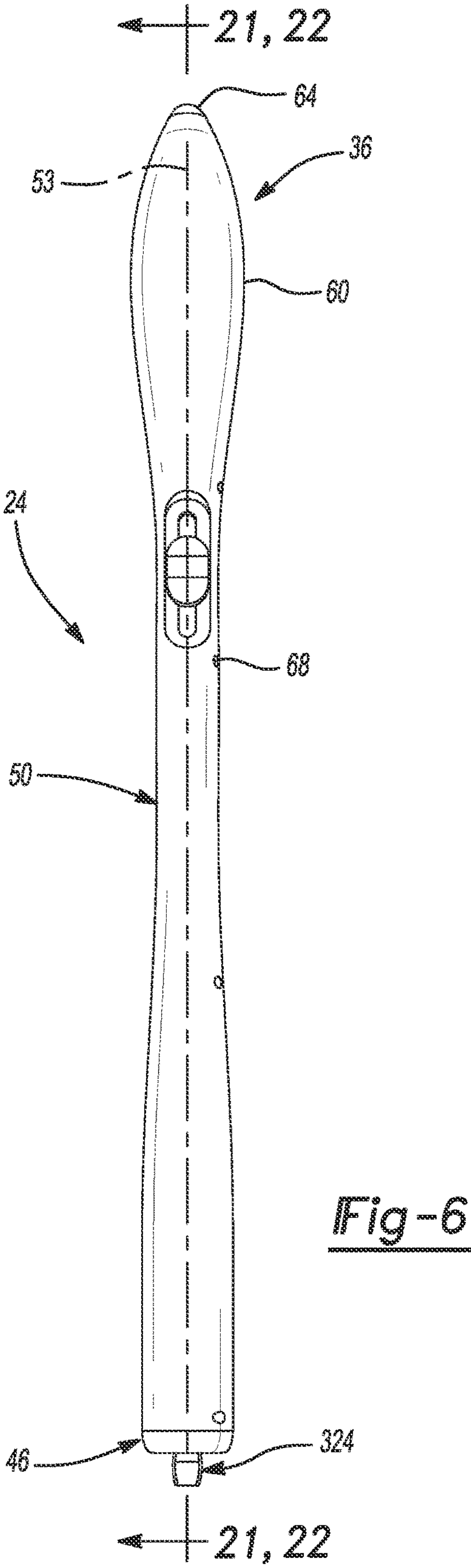
FIG. 6 is a front elevation view of a handle assembly.
Figure 7:
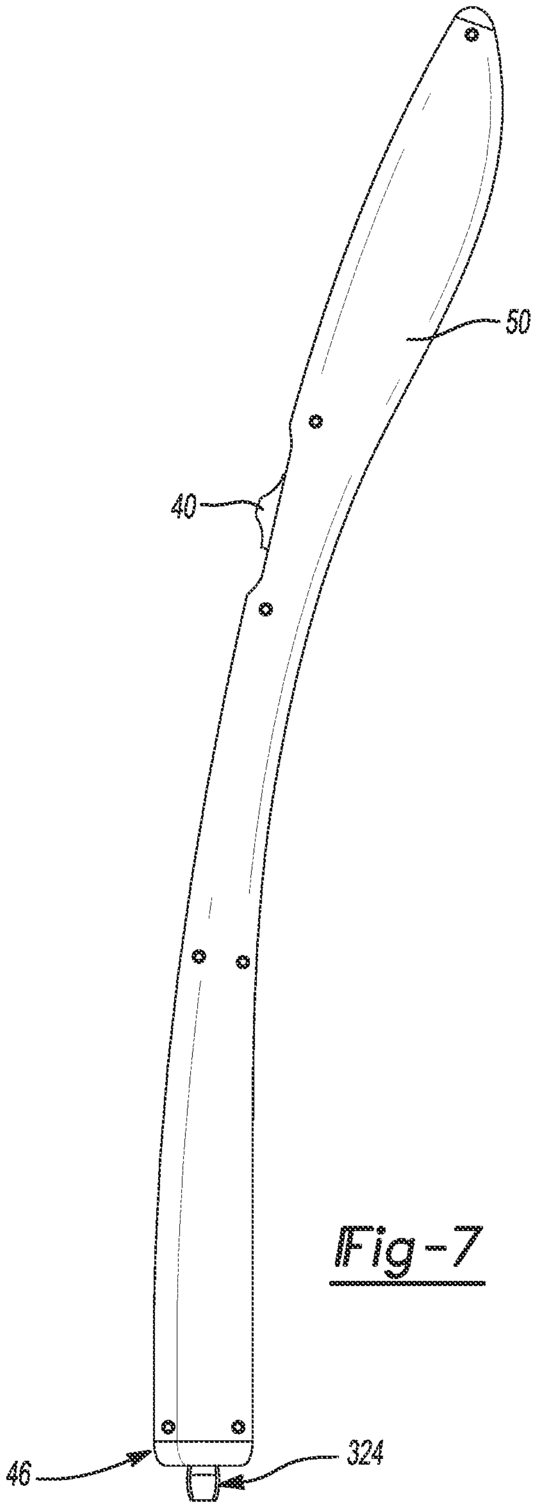
FIG. 7 is a second side elevation view of a handle assembly.
Figure 8:
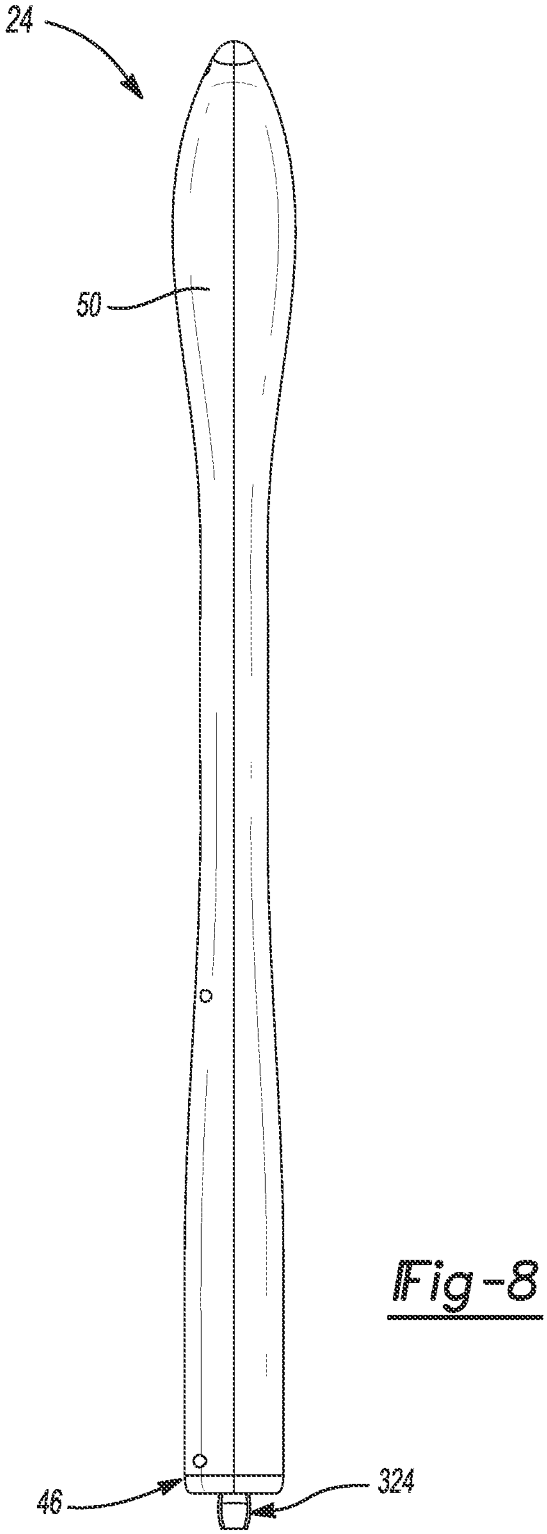
FIG. 8 is a rear elevation view of a handle assembly.
Figure 9:
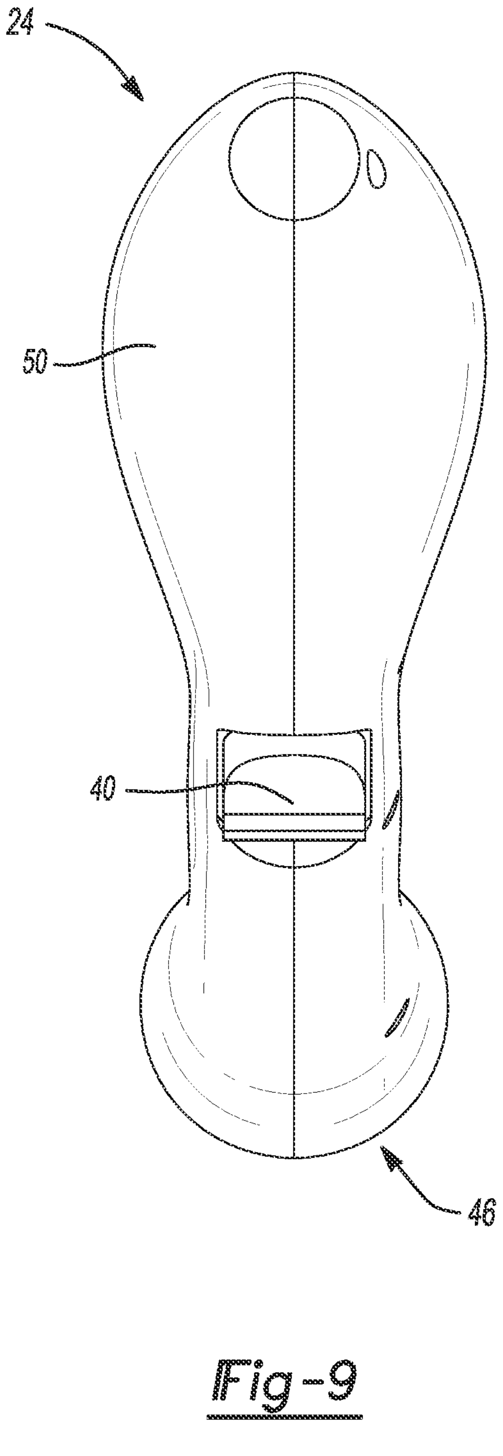
FIG. 9 is a first end view of a handle assembly.
Figure 10:
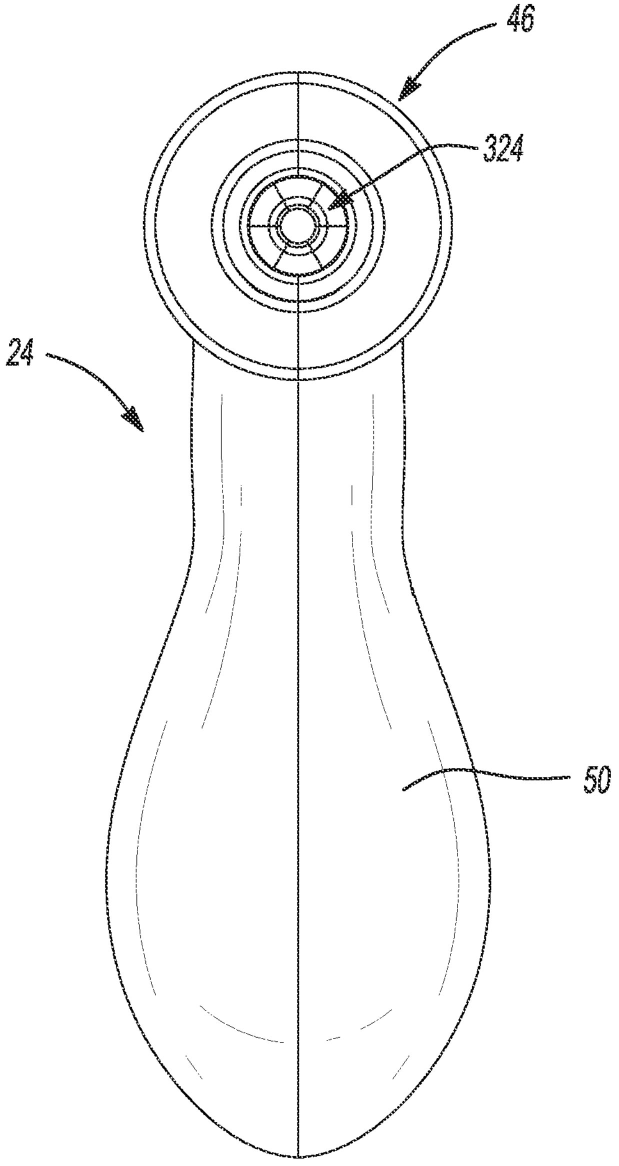
FIG. 10 is a second end view of a handle assembly.

With particular reference to FIG. 6, the handle 24 may also taper relative to a long axis 53 of the handle 24. For example, the grasping region 36 may taper from the central or bulbous region 60 to the distal end 64 and toward the waist 68. Again, the handle 24 may taper from the waist 68 to the end 46. Thus, the handle 24 may include a selected geometry for grasping and manipulating the handle 24.

Figure 11:
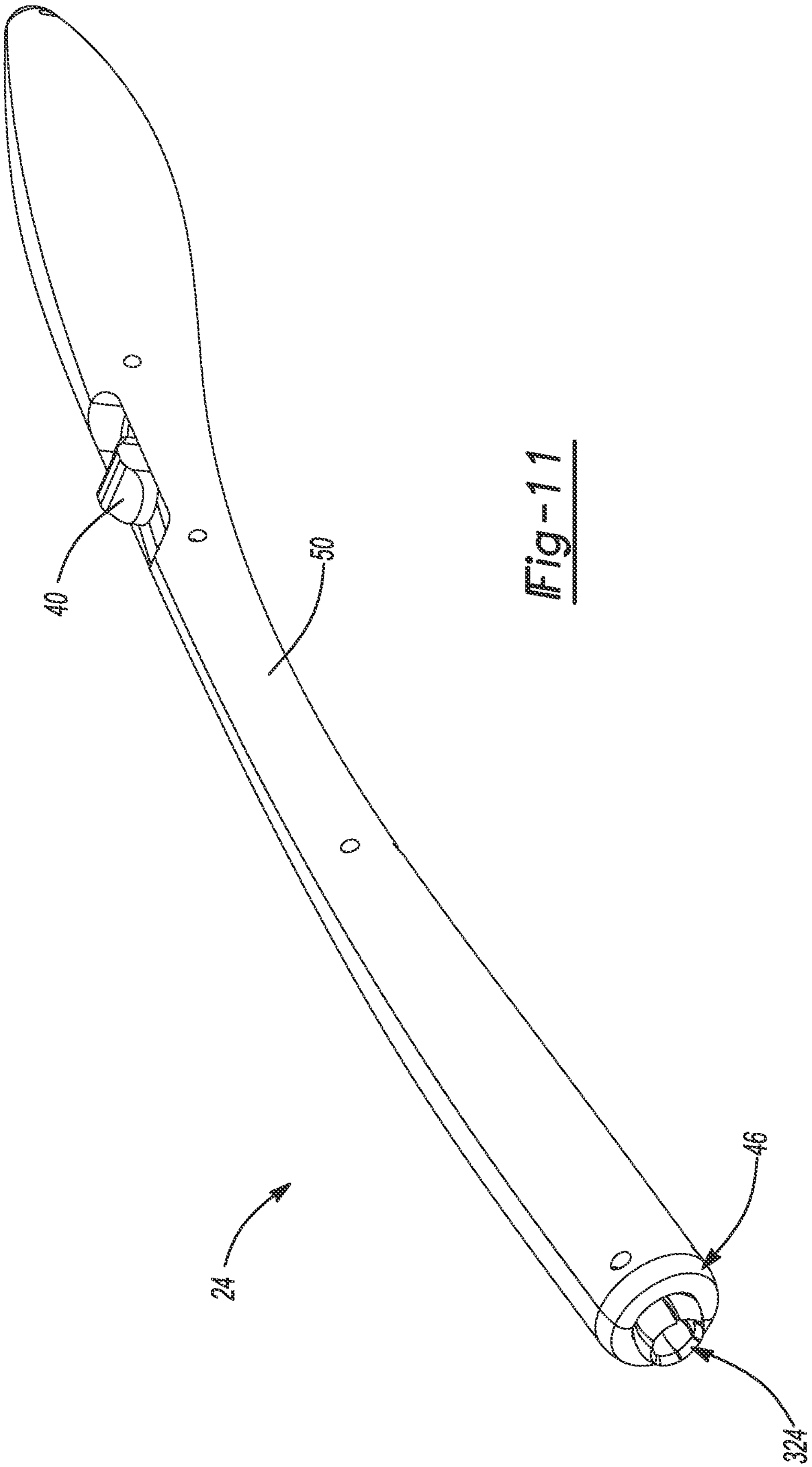
FIG. 11 is a detail end view of a handle assembly of FIG. 1.
Figure 12:
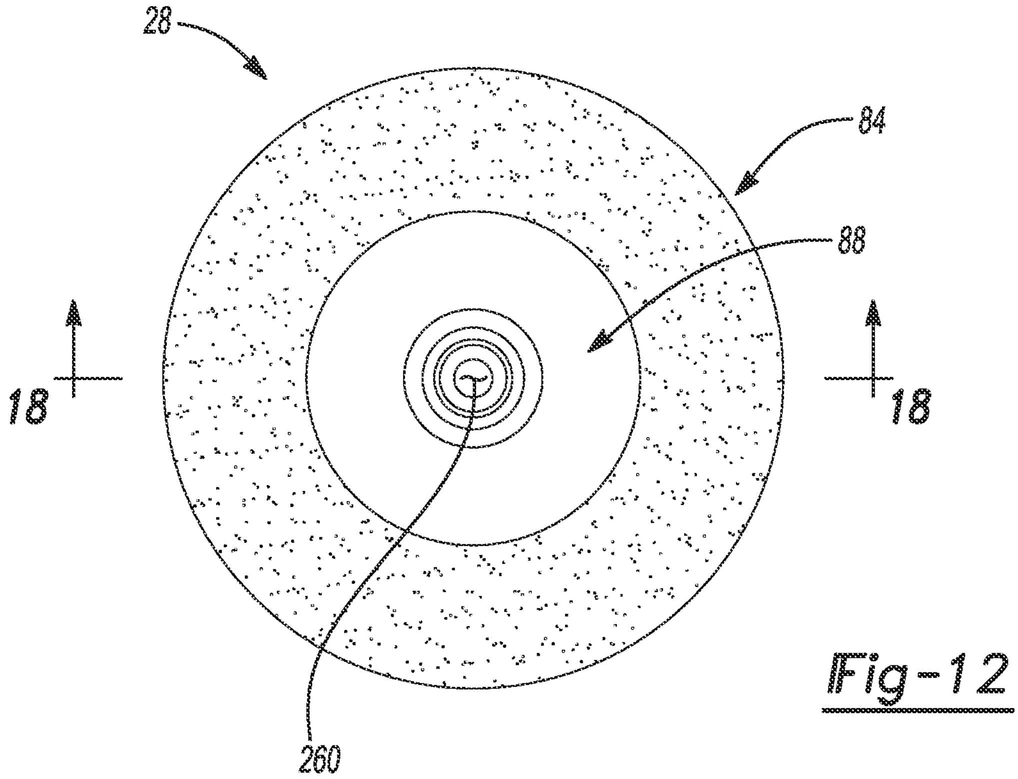
FIG. 12 is a top plan view of a head assembly.
Figure 13:
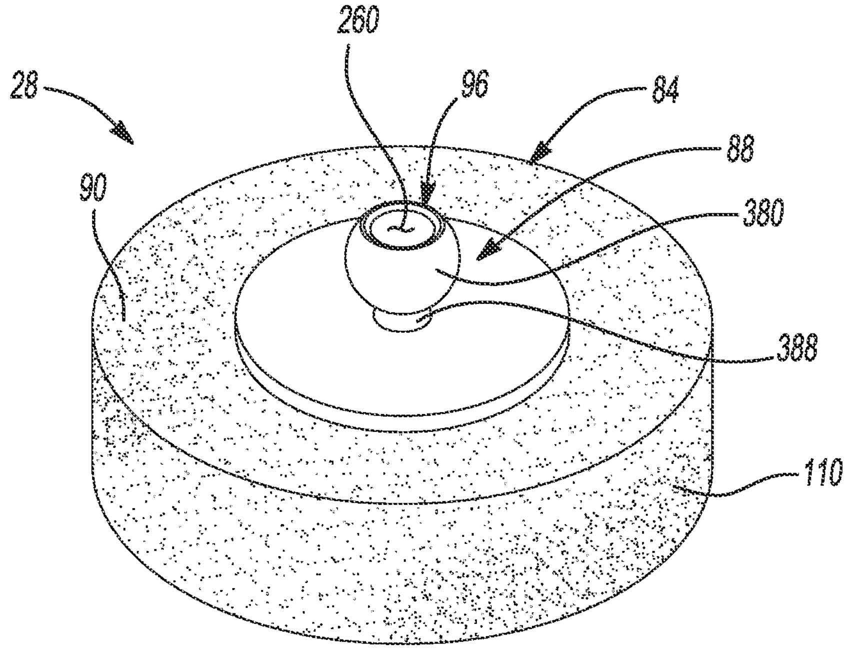
FIG. 13 is a top perspective view of the head assembly of FIG. 12.

With continuing reference to FIGS. 1-9, and additional reference to FIG. 11, briefly, the cleaning or working assembly 20 includes various components to assist in operating or moving the cleaning portion or pad 28 with the handle portion or region 24. As discussed above, a control or operation button 40, which may also be referred to as a control mechanism, may be used to move selected portions of an actuation mechanism 80 to engage and disengage the cleaning portion or head 28. The actuation mechanism 80 may assist in engaging (e.g. coupling) and/or disengaging (e.g. decoupling) the head 28. The actuation mechanism 80 may include or activate various components of a coupling mechanism, as discussed herein.

With further reference to FIGS. 12-16, the head portion 28 may include a substrate that may also be referred to as a cleaning substrate or cleaning sponge or surface cleaning portion 84. The substrate 84 may include (e.g. engorged or loaded with) a cleaning composition, such as a solution. The cleaning composition may include one or more materials and may be selectively released during use of the head 28. In various embodiments, the cleaning composition releases from the substrate when the cleaning head 28 contacts water.

The head 28 may further includes a fitment or engagement region 88. The fitment 88 may be a selected shape, such as annular. The fitment 88, as discussed further herein, may be engaged into a selected portion of the cleaning sponge or substrate 84. In various embodiments, the substrate 84 includes a first or top surface 90 and a second or bottom surface 92. The two surfaces 90, 92 are generally opposed to one another. The fitment 88 may include a base, flange, or collar 94 and an engaging or coupling portion 96. The collar may include or define a surface 94*a* that may engage and/or be fixed to the top surface 90 of the substrate 84. The fitment 88 may be fixed with a selected adhesive, welding, or other appropriate fixation. Alternatively or additionally, the fitment may be over molded by the substrate 84, the substrate 84 may be a depression (e.g. a central depression) to receive the fitment 88, etc. In various embodiment, therefore, the fitment 88 is fixed to the substrate 84 for a selected period, such as during use of the head 28 and engagement of the head 28 to the wand 24.

With reference to FIGS. 12-17, the head assembly 28 is illustrated in detail and alone. Generally, the head assembly 28 may be provided in a selected shape. In various embodiments, the head assembly 28 may include a substantially circular or cylindrical outer wall 110. As discussed herein, however, the head assembly 28 may also have other selected geometries such as faceted (e.g. hexagon or octagonal) and/or selected curved shapes. The head assembly 28 having the cylindrical outer wall 110 may include a selected diameter 114 that extends through a center 118 of the head assembly 28. The diameter 114 may be any appropriate dimension, such as about 5 centimeter (cm) to about 25 cm, including about 5 cm to about 10 cm, and further including about 7 cm to about 8 cm. Further the head assembly 28 may include a height 122. The height 122 may be any appropriate dimensions, such as about 0.5 cm to about 10 cm, including about 0.5 cm to about 5 cm, and further including about 1.2 cm to about 3 cm.

As discussed above, the fitment 88 may be fixed to the top wall 90 of the substrate 84. Generally, the fitment 88 may be substantially rigid to assist in supporting the substrate 84. The cleaning or substrate portion 84 may be resilient, but includes some flexibility and/or abrasiveness, such as to assist in effectively cleaning selected surfaces. In various embodiment, for example, the fitment 88 may be connected (e.g. fastened, adhered, welded, etc.) to the wall 90 of the sponge or pad portion 84. The head 28 may therefore be engaged to and disengaged from the engagement end 46 of the handle assembly 24.

Figure 14:
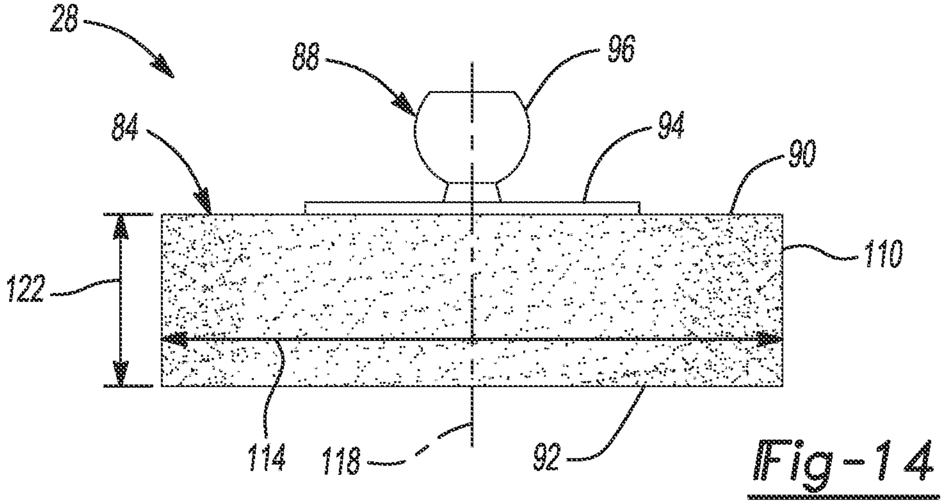
FIG. 14 is a side plan view of the head assembly of FIG. 12.
Figure 15:
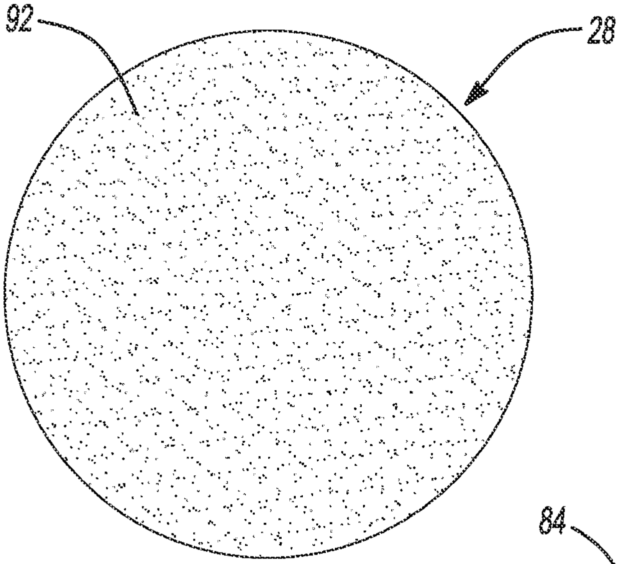
FIG. 15 is a bottom plan view of the head assembly of FIG. 12.
Figure 16:
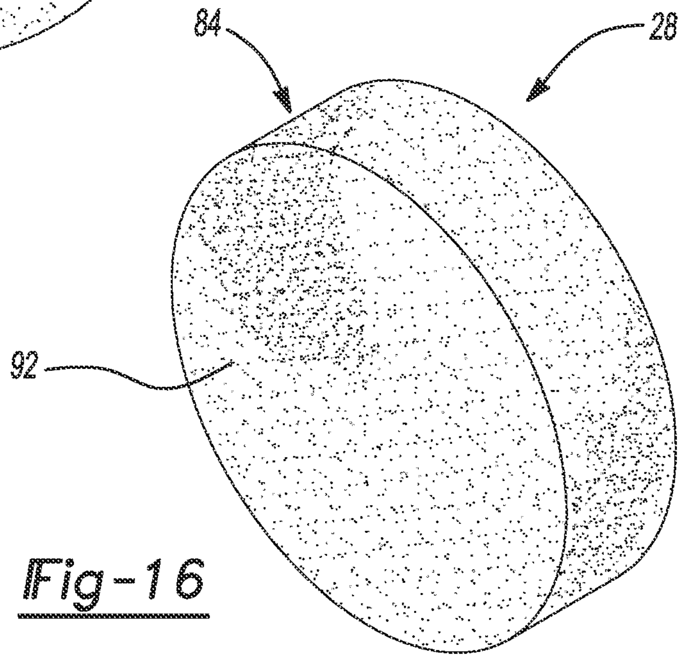
FIG. 16 is a bottom perspective view of the head assembly of FIG. 12.
Figure 17:
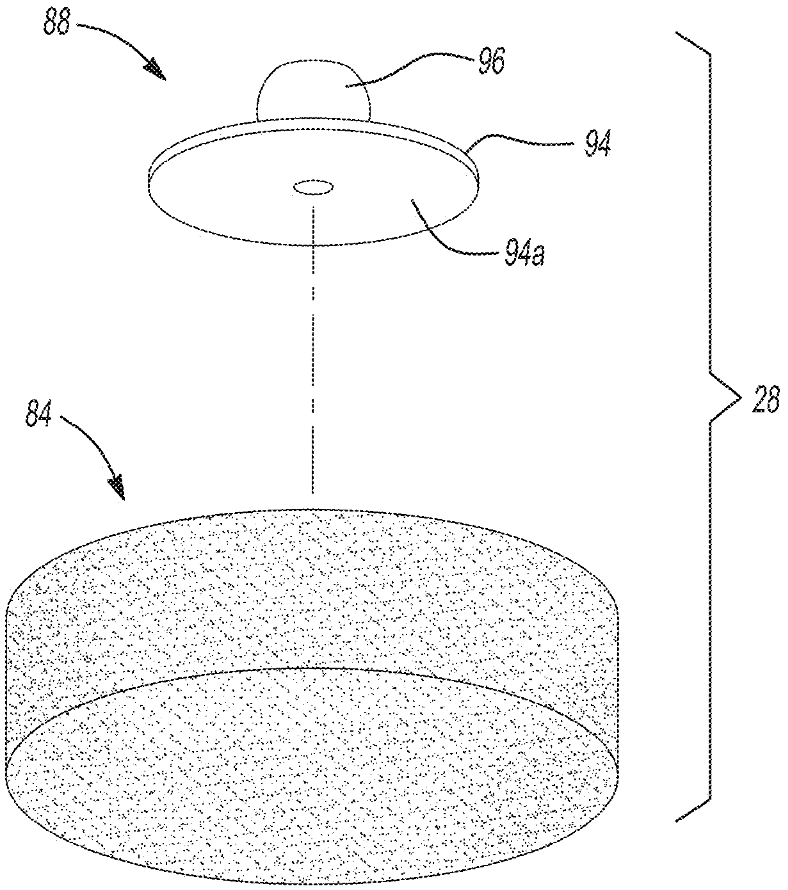
FIG. 17 is an exploded bottom perspective view of the head assembly of FIG. 12.

As illustrated in FIGS. 12-17, the head 28 may be substantially circular. It is understood, therefore, that the top and bottom of the pad may be substantially identical to one another as may be a side view of the outer circular wall 110 of the pad 84. The head 28, therefore, may be substantially symmetrical on all sides, when looked at from a side view, as illustrated in FIG. 14. Further, the fitment 88 may be provided in any appropriate configuration, and may be formed integrally or as a single member with the substrate 84. Accordingly, the head assembly 28 may also be substantially symmetrical when viewed from both the top and bottom view.

As discussed and illustrated herein, the handle assembly 24 may be operated, such as with the control button 40, via the mechanism 80 to engage and disengage the head 28 from the handle assembly 24. This may allow the head 28 to be used for a selected period of time when engaged to the handle assembly 24 and then disengaged therefrom without contacting the head 28. Further, this may also allow the handle 24 to be used for a plurality of uses with a plurality of different heads 28. Further, the fitment 88 may be selectively included or not included in the head assembly 28, according to various embodiments. Nevertheless, the fitment 88 may also be provided substantially symmetrical to extend a selected distance into the pad portion 84. In various embodiments, the pad assembly 24 may be substantially solid at a region opposite the engagement region 88 or the collar portion 94 of the head assembly 28.

Figure 4:
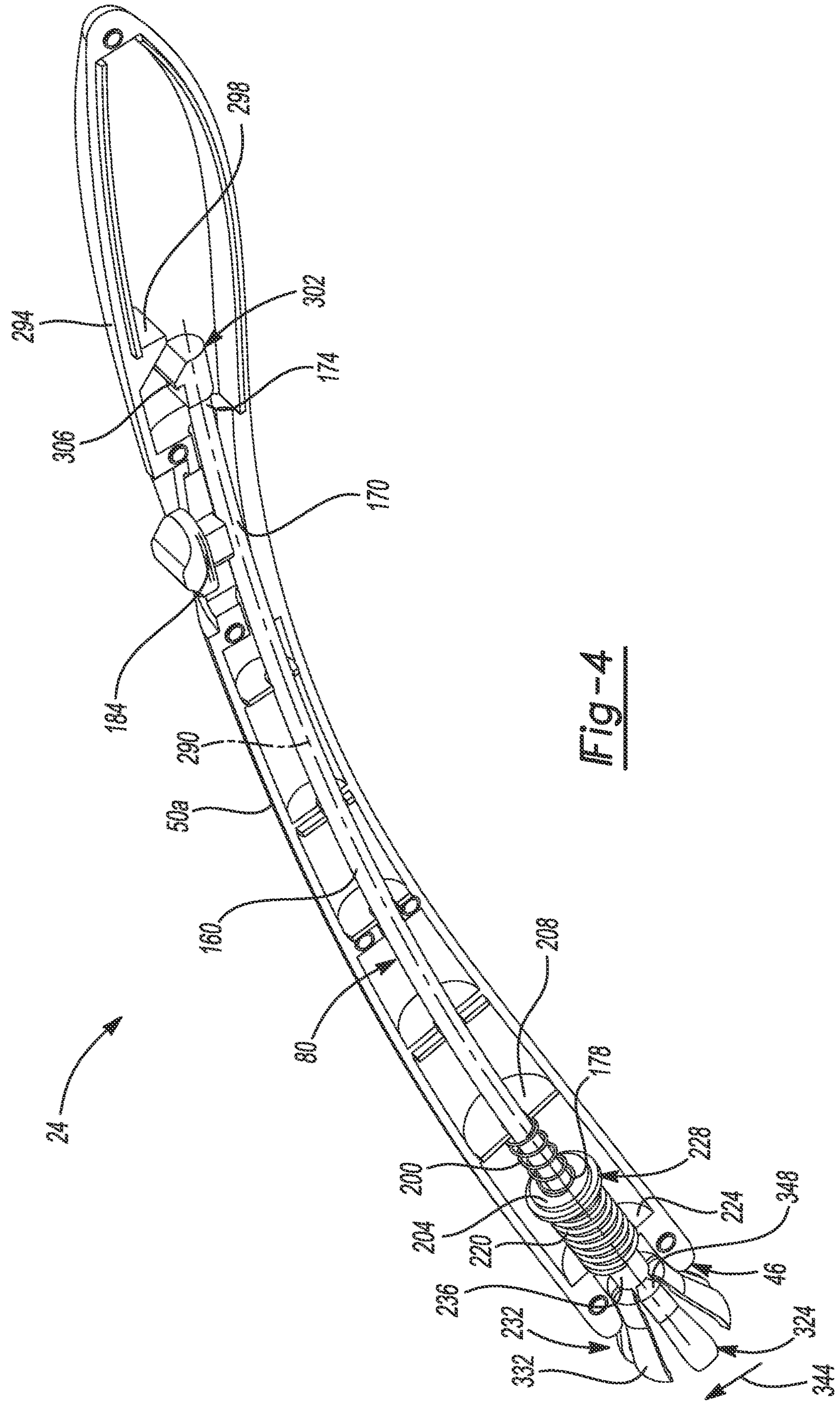
FIG. 4 is a partial exploded view of the handle assembly.

With continuing reference to the FIGS. 1-17, but with particular reference to FIGS. 3 and 4, the mechanism 80 may be operated with the control button 40 to move selected portions of the mechanism 80 relative to the external wall 50 up the handle 24. As discussed above, in various embodiments, the wall 50 may be formed as a clamshell, including two portions such as a first portion 50*a* and a second portion 50*b*. The wall 50, however, including either the two portions 50*a*, 50*b*, or a selected number or portions, may be provided to form the wall.

Generally the wall 50 may include a hollow or selectively hollow interior structure to allow the mechanism 80 to operate within the walls 50 of the handle 24. In various embodiments, the wall 50 may be substantially hollow or include an outer wall surface with one or more stabilizing, reinforcing, and/or stabilizing ribs 140. The stabilizing ribs 140 may extend from an internal surface 144 of the wall 50 toward a central portion or region which may substantially define an opening or passage to allow for movement (e.g. axial and/or along a length of the handle portion 24) of a control rod or rod member 160 of the mechanism 80. The rod 160 may pass through the supports 140 to a selected portion of the mechanism 80. In various embodiments, for example, the supports 140 include one or more grooves or passages 164 in which the rod 160 may be held, guided or allowed to pass or move.

In various embodiments, the control button 40 may engage or be fixed to a selected portion of the rod 160. In various embodiments, the control button may be fixed at a control point or portion 170 that is intermediate a first distal end 174 and a second distal end 178 of the rod 160. The control member or button 40 may be fixed to the rod 160 in a selected manner, such as with an adhesive, by welding, a snap or interference fit, or other selected fixation mechanisms. It is understood, however, that the control button 40 may be fixed to the rod 160 in any appropriate manner to allow a user to engage the button 40 and move the rod 160.

The control button 40 may include a track or groove 184 that may engage or receive a finger or projection 186 from one or more of the wall portions 50. The projection 186 engaging the groove 184 may assist in directing and controlling movement of the control button 40. Accordingly, the control button 40 may generally move in a substantially longitudinal axial direction, such as generally defined by the projection 186 such as in the direction of the arrows 190*b*. The movement or the control button 40 may allow or control movement of the mechanism 80 within the assembly 24. Thus, the handle assembly 24 may be operated by a user, such as with a single hand with a single digit engaging the control button 40, to engage and disengage the head portion 28 from the handle portion 24. Thus, the head 28 may be selectively coupled and decoupled from the handle 24.

The mechanism 80 may be operated by the user at the control button or switch 40. The actuation mechanism 80 may include or activate various components of a coupling mechanism, as discussed herein. The mechanism 80 includes the control button 40 that operates the rod 160 and/or moves the rod 160. The control button 40 may move the rod 160 generally in the direction of the arrows 190*a*, 190*b*. Generally the direction 190*a* is toward the distal end 64 and the arrow 190*b* is toward the engaging end 46. As discussed further herein, the control button 40 may operate the mechanism 80 into a plurality of configurations relative to the head assembly 28 and particularly the fitment 88 thereof, such as a coupled or de/uncoupled configuration or position.

With continuing reference to FIG. 3, as discussed above, the mechanism 80 may include a first biasing member 200. The first biasing member may be engaged between a first washer or contact portion 204 that may be fixed to the rod 160 at a selected location, such as between the two ends 174, 178. The biasing member 200 may also be positioned to engage one of the stabilizing ribs, such as a stabilizing rib 208. The stabilizing rib 208 may be one that is formed near the engaging end 46. The stabilizing rib 208 may be similar to the other stabilizing ribs 140 such as including a depression or passage therethrough, but may be positioned to engage the biasing member 200.

The mechanism 80 may further include a second biasing member 220 that may be positioned near or between a distal wall or stabilizing rib 224 and a second washer or wall 228. The second wall washer 228 may be formed separately, but fixed to an engaging mechanism that may also be referred to as a finger assembly 232. The finger assembly 232 may include an extending member or portion 236, which may be hollow or form a bore, as illustrated herein. The extending portion 236 may have a proximal end 238 that engages a bore or passage 242 of the wall or washer 228. Thus, in an assembled position or configuration, the washer 228 may be fixed to the finger assembly 232, as discussed further herein. It is understood, however, that the finger assembly may be formed as one piece with the washer 228. Accordingly, the biasing member 220 may be positioned between the washer 228 and the biasing wall 224 of the cleaning assembly 20, as discussed further herein.

The mechanism 80 may further include a pin or extension member 250. The pin 250 may include a distal end or portion 254, which may also be that may also be reference to as a stem or tip portion, includes a tapered projection 256 that may be engaged or received in the engaging portion 96, such as in a depression or engaging bore 260 thereof. The pin 250 may further include a shaft or extension member 258. The extension member 258 may extend through the finger assembly 232 and be fixed relative to the rod 160. In various embodiments, for example, the pin portion 250 and the rod 160 may be formed as a single member of the mechanism 80. In various embodiments, the pin 250 may be fixed to the rod in an appropriate manner, such as with an adhesive, welding, or the like. Also, a reinforcing pin or holding portion 264 may be engaged in a first bore 268 of the rod 160 and a second bore 272 of the pin 250. Therefore, the rod 160 and the pin 250 may be assembled into a substantially unitary member or assembly during operation of the cleaning assembly 20 such as to engage and disengage the head assembly 28 from the wand assembly 24.

Figure 5:
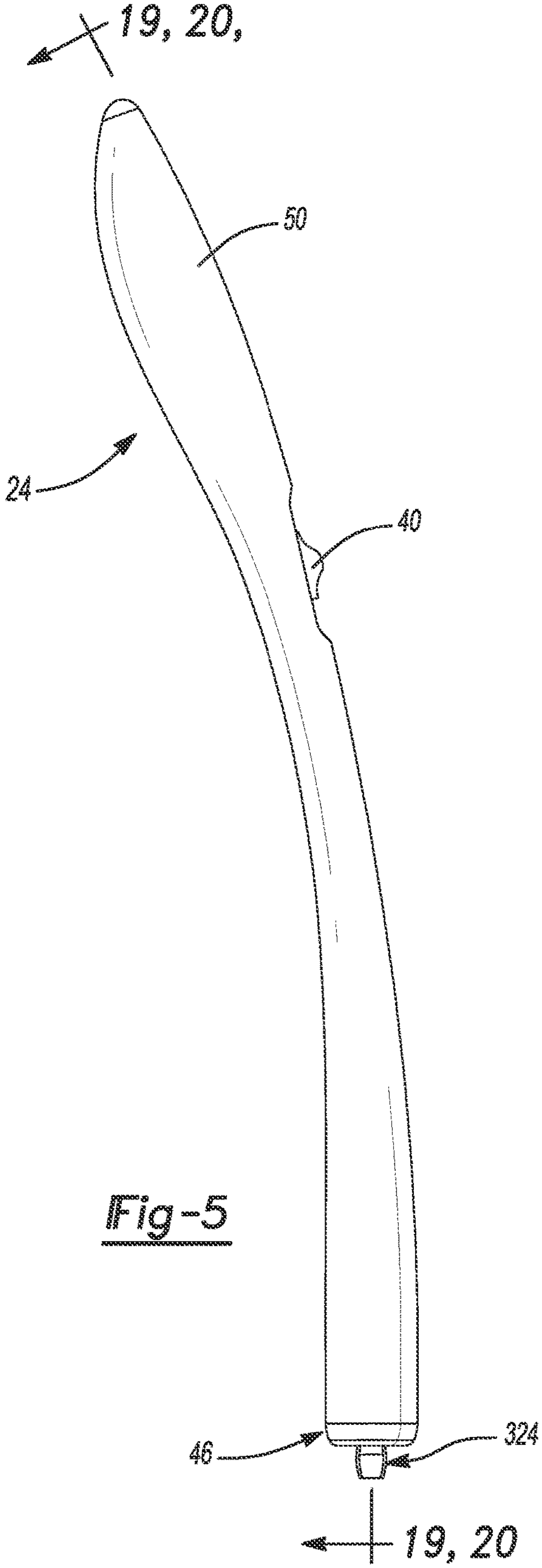
FIG. 5 is a first side elevation view of a handle assembly.

With continuing reference to FIG. 5, the rod 160 may be formed to be substantially straight, but formed of a plastic or flexible material. As illustrated in FIG. 4, therefore, when assembled in the handle assembly 24, the rod 160 may have a selected arc. The rod 160 may extend along the arc 290 through the handle assembly 24, such as formed by the passages 164 and the support ribs 140. The arc or curve 290 may be any selected curve, such as 0 to 80 cm radius, including about 0 cm to about 65 cm radius, and further including about 55 cm to about 65 cm radius. It is understood, however, that the radius may have a small range or size depending upon selected materials and/or construction, such as a one piece rod 160 that may have a radius of about 40 cm to about 60 cm. The curve 290 may be formed or defined by the passages 164 as the rod 160 extends therethrough.

The arc of the rod 160 may allow the rod 160 to be arced within the wall 50 of the handle assembly 24. Accordingly the mechanism 80 may be biased in a selected position. For example, as illustrated in FIG. 4, the rod 160 may be biased toward a front side 294 of the wall 50, such as the wall portion 50*a*. The rod 160, therefore, may interact with portions of the wall 50 such as a projection or stop 298. The mechanism 80 may include a catch or holding member 302 that has or defines a holding catch or finger 306. The finger 306 may engage the stop 298 to hold the mechanism 80 in one or more selected positions, as discussed further herein.

Further, the mechanism 80 may be formed or assembled such that the first washer or wall 204 is substantially fixed to the rod 160. The washer 204, fixed to the rod 160, may move with and/or more the rod 160. For example, the biasing member 200 may apply a force to the washer 204 to assist in moving or positioning the mechanism 80 in one or more selected positions. In various embodiments, for example, the biasing member 200 may bias the rod 160, by being fixed thereto, generally in the direction of the arrow 190*b* toward the engaging end 46.

The rod 160 may be connected with the pin 250 through the finger assembly 232. The finger assembly 232 may be fixed to the second wall or washer 228. The second biasing member or biasing member 220 may bias the finger assembly 232 in a selected direction, such as generally in the direction of arrow 190*a*. The biasing member 220, as discussed above, may apply a force between the wall 228 and the surface 224 of the handle wall 50.

As illustrated in FIG. 3, the finger assembly 232 further includes a selected finger or grasping portion 320 that extends from the extending portion 236. The finger or grasping portion 320 may include one or more, such as a plurality, of fingers 324. The fingers 324 may generally be formed substantially identical to one another, therefore, discussion of the single finger 324 herein may be understood to relate to any appropriate ones of the fingers in the finger portion 320. It is further understood that the fingers 324 may be provided in any appropriate number to engage the fitment 88, as discussed further herein. Accordingly, the finger assembly 232 may include six of the fingers 324 in the finger portion 320, as illustrated and discussed herein, but the number of fingers may be selected to be able to engage and disengage the fitment 88 as discussed herein. The fingers 324 may resiliently move and/or engage the fitment 88, as discussed herein.

With continuing reference to FIG. 3, the plurality of fingers 324 may generally extend from an end 328 of the extending portion 236 of the finger assembly 232. The fingers 324 may generally be formed as a single piece with the extending portion 236 and/or fixed thereto to form a mechanism including the finger portions 320. Accordingly, in various embodiments, the extending portion 236 may be formed in a mold with the fingers 324. The fingers 324, therefore, may be formed in a substantially open or expanded configuration and may, therefore, be biased in the open position.

The fingers 324 have an exterior surface 332 that may engage an internal surface 336 of the wall 50 at the engagement region 46 of the handle assembly 24. The engagement of the exterior surface 332 of the fingers 324 with the surface 336 of the handle 50 may cause the fingers 324 to compress or contract in a selected direction, such as generally toward a central axis 340, generally in the direction of arrow 344.

When compressed, the fingers 324 may resiliently move generally in the direction of the arrow 344 such as by flexing or compressing, such as along the length of the finger 324 and relative to a selected portion of the fingers 324, relative to the extending portion 236 such as at an end 348 of the finger 324. The end portion 348 may be formed in a selected manner, such as a living hinge or flexible region of the finger 324. It is understood, however, as discussed further herein, that the length of the finger 324 may also be formed of a selected material that may be substantially flexible or elastically deformable to be compressed by engagement with the internal wall 336. When moved away from or disengaged from the wall 336, however, the fingers 324 may expand (e.g. substantially automatically) to a selected shape, such as a generally uncompressed or expanded configuration.

The fingers 324, including the whole finger assembly 232, or selected portions thereof, may be formed of a selected polymer material, such as selected plastics. Selected polymers may include polyolefins such as selected polyethylenes and polypropylenes. Exemplary materials may include Delrin® polyoxymethylene sold by DuPont. Other selected polymers may include nylon, such as selected nylons and/or nylons with selected fillers. Therefore, the fingers 324 may be formed in a selected manner and of selected materials to move or flex as discussed above and herein to engage and disengage the fitment 88.

Figure 18:
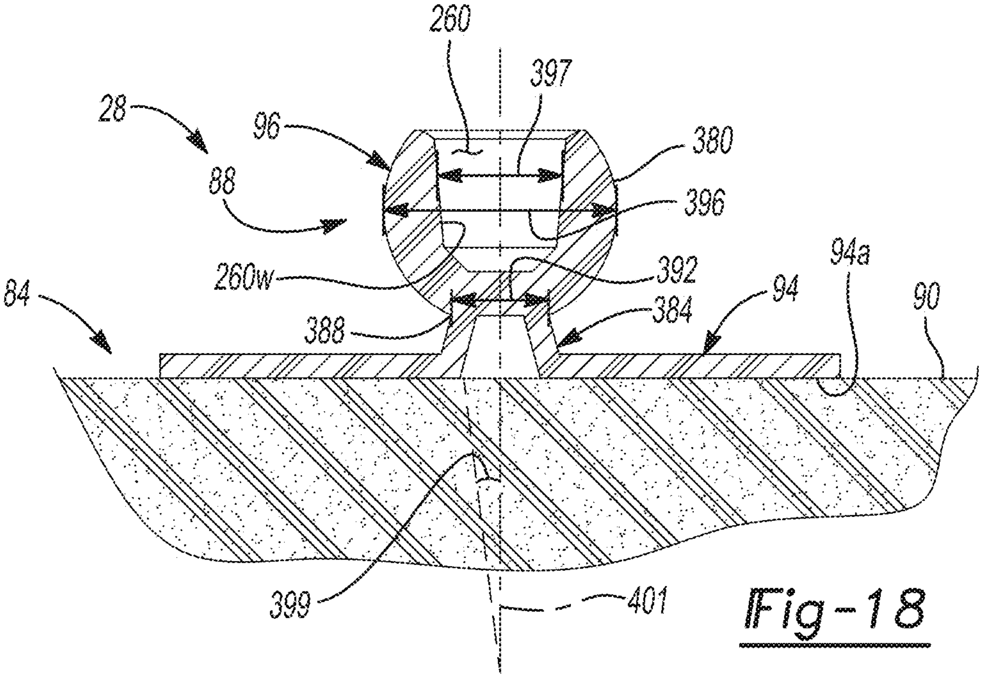
FIG. 18 is a cross-section view taken along line 18-18 of FIG. 12.

Turning reference to FIG. 18, the head assembly 28 may include the fitment portion or element 88 and the substrate 84. The cleaning head or substrate 84 may be formed of an appropriate material, such as one as generally flexible, deformable, and/or able to absorb or hold a selected cleaning material. In various embodiments, for example, the substrate 84 may be loaded with a selected substance that may be released upon contact with water to assist in cleaning with the cleaning assembly 20. The substrate 84, therefore, may be an open cell foam, a closed cell foam, or combinations thereof. Further, the substrate may be formed of one or a plurality of members that are fixed together and/or fixed to the fitment 88. Generally, the substrate 84 includes the top surface 90 that is fixed to the collar or bottom surface 94*a* of the fitment 88. Extending away from the substrate 84 is the engaging portion 96 of the fitment 88.

The engagement portion 96 may include a selected outer surface 380. The outer surface 380 may have or define an arc or curve that may extend to a stem or neck 384. Accordingly, the outer surface 380 may have an under portion or under curve 388 that has a first dimension 392 and an upper or second dimension 396. Generally, the upper dimension 396 is larger than the first or stem dimension 392. The first dimension 392 may be about 0.5 millimeters (mm) to about 10 mm, including about 2 mm to about 5 mm, including about 3 mm. The second dimension 396 may be about 5 mm to about 25 mm, including about 5 mm to about 15 mm, and further including about 9 mm to about 15 mm, such as about 11.5 mm. Generally, dimensions may include a selected tolerance of about 0.01 mm to about 0.5 mm. Thus, the outer surface 380, which may be curved and/or smooth, as discussed and illustrated above, for example in FIG. 13. As discussed further herein, therefore, the engagement portion 96 having the surface 380 may be generally or at least be partially spherical and may act as a ball that may articulate within a socket, such as a socket formed with the finger assembly 232. The engagement or coupling portion 96 may extend generally perpendicular to or from the base 94.

Figure 20:
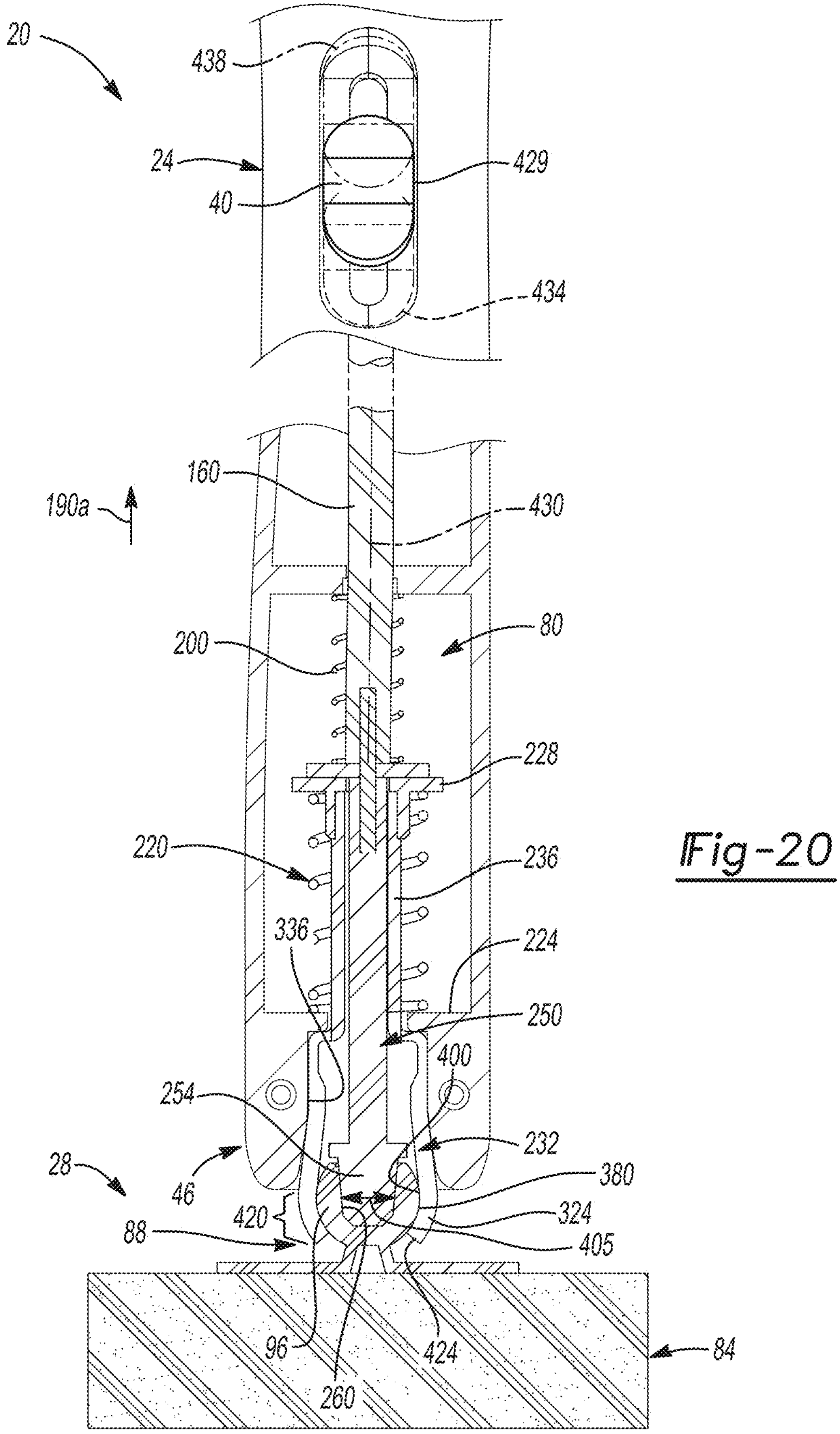
FIG. 20 is a detail cross-section view of the handle assembly taken along line 20-20 of FIG. 6, according to various embodiments, in a coupled and fixed configuration.

With continuing reference to FIG. 18 and brief reference to FIG. 20, the engagement portion 96 includes or defines the depression or engaging bore 260 that may include in internal dimension 397, which may be a diameter. The internal dimension 397 may be about 1 mm to about 10 mm, including about 2 mm to about 5 mm, including about 3 mm. The depression or engaging bore 260 may also taper a selected amount, such that a wall 260*w* that defines the depression or engaging bore 260 may have an angle 399 of about 1 degree to about 20 degrees relative to an axis 401. Also, the tip portion 254 may include an external dimension 405. The external dimension 405 may generally allow for a tight or firm connection with the bore 260. In various embodiments, the dimension 405 is within about 1 mm of the dimension 397. For example, the dimension 405 is about 0.01 mm to about 1 mm smaller than the dimension 397. In various embodiments, the dimension 405 is at most 1 mm less than the dimension 397.

With continuing reference to FIGS. 1-18 and with further reference to FIGS. 19-22, the cleaning assembly 20 may be formed of the handle assembly 24 and the head assembly 28. The head assembly 28 may be formed as a single or minimal use assembly that may be discarded and/or recycled at a selected time. The handle assembly 24, however, may be formed to couple with a plurality of the head assemblies 28 over an extended period of time, such as sequentially. Thus, the head assembly 28 may be used for a selected period and removed or disengaged from the handle assembly 24 to allow for engagement of a following head assembly. Accordingly, with reference to FIGS. 19-22 the connection and interaction of the handle assembly 24 with the head assembly 28 will be discussed in further detail.

Figure 19:
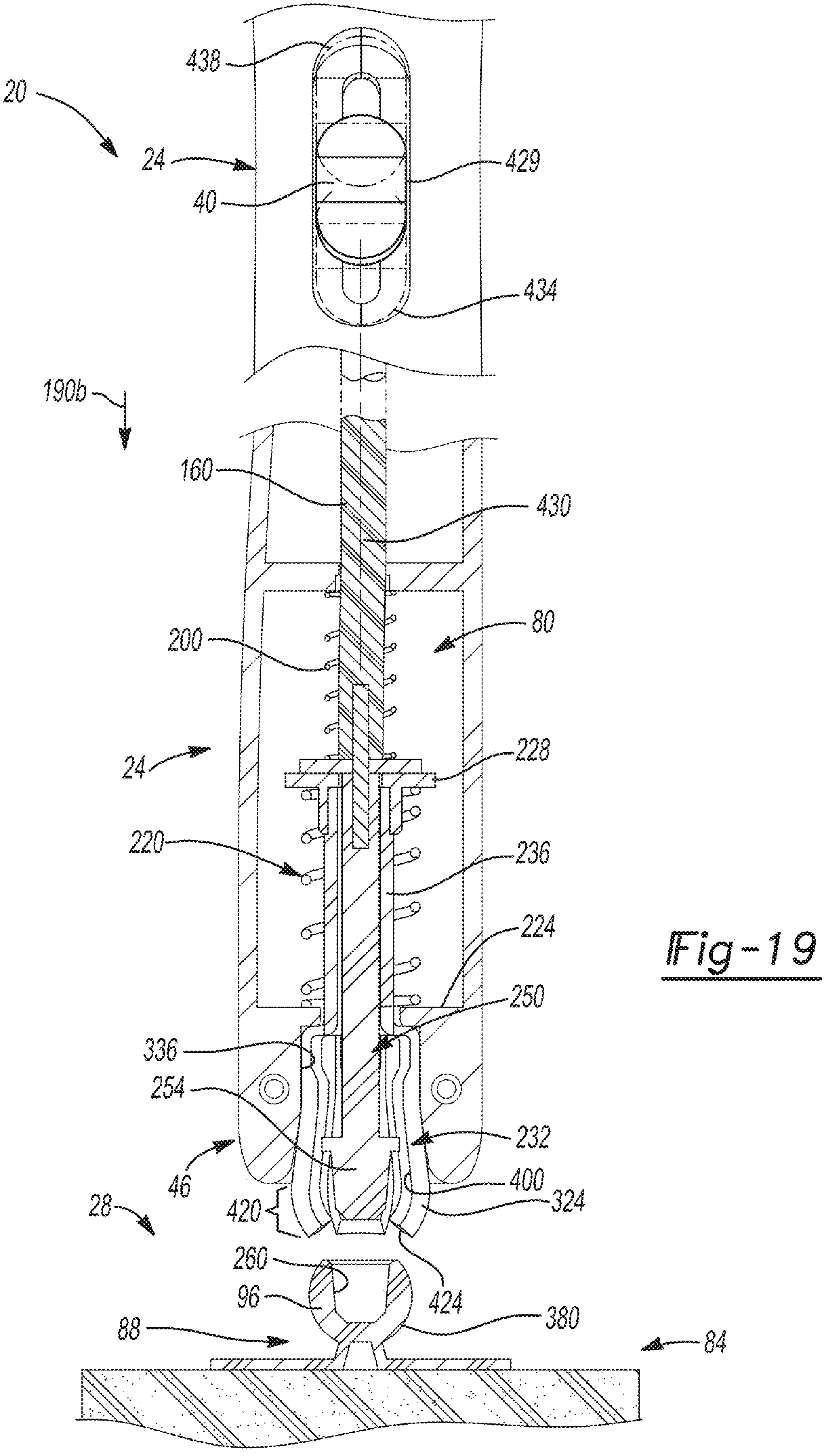
FIG. 19 is a detail cross-section view of the handle assembly taken along line 19-19 of FIG. 6, according to various embodiments, in a ready configuration.

With initial reference to FIG. 19, the handle assembly 24 may generally have an accepting and/or fixed head configuration, as illustrated in FIG. 19. Generally in the engaged/fixed head assembly configuration, the finger assembly 232 is engaging the inner wall 336 and biased within the engaging end 46 due to the biasing member 220 biasing the mechanism 80. The biasing member 220 engages the wall surface 224 and the plate or washer member 228 fixed to the finger assembly 232 to bias the fingers 324 generally in the direction of arrow 190*a*. When the fingers 324 are biased in the direction of arrow 190*a*, the external surface of the fingers 324 engage the internal wall 336 of the engagement region 46 to form a socket configuration, as illustrated in FIGS. 19 and 20.

In the receiving or contracted configuration, as illustrated in FIG. 19, the fingers 324, therefore, may define an internal curve 400 that may engage the external curved surface 380 of the engagement portion 96. Due to the internal curved portion 400 of the fingers 324, a socket or substantially socket configuration having a selected curved internal diameter or configuration may be formed with the plurality of the fingers 324. The fingers 324, therefore, may engage the external surface 380 of the engagement member 96. As illustrated in FIG. 19, the socket configuration may be formed and defined by the finger assembly 232 due to the interaction of the finger assembly 232 with the internal surface 336 of the engagement end 46. The socket configuration, therefore, may be provided in an accepting or receiving configuration to receive the head assembly 28.

The head assembly 28 may include the engaging region 96 to engage within the socket assembly, including the socket portion 400, of the finger assembly 232 as the handle 24 moves in the direction of arrow 190*b*, illustrated in FIG. 19, to an engaged or coupled configuration as illustrated in FIG. 20. The finger assembly, including the fingers 324, may have a selected flexibility, as discussed above. Accordingly, a selected region, such as an exposed region 420 of the fingers 324, may have a selected flexibility to engage and move around the engagement portion 96 as the handle assembly 24 generally moves in the direction of arrow 190*b*.

As the handle assembly 24 moves in the direction of 190*b* toward the head assembly 28, the exposed finger portions 420 may engage the surface 380 of the engagement portion 96 of the head assembly 28. Due to the flexibility of the fingers 324, the fingers 324 may flex around the engagement region 96 to allow the engagement region 96 to move into a captured, coupled, or engaged position or configuration with the finger assembly 232. The engaged position may also be referred to as a coupled position when the head assembly 28 is coupled to the handle assembly 24, such as when being received within the socket portion or region 400. Thus, the head assembly may be engaged to the finger assembly 232, as illustrated in FIG. 20.

The handle assembly 24, therefore, may be engaged to the head assembly 28 by relative movement of the head assembly 28 to the handle assembly 24. It is understood that the handle assembly 24 may move in the direction of arrow 190*b* toward the head assembly 28. In addition and/or alternatively thereto, the head assembly 28 may move toward the handle assembly generally in the direction of arrow 190*a*. Regardless of the specific combination of movements, however, the finger assembly 232 may be moved toward the engagement portion 96. The exposed portion 420 of the fingers 324 may deflect a selected amount to pass over a selected portion of the engagement region 96 and hold the engagement region 96 relative to the handle assembly 24 when the fingers 324 have moved a selected distance over the engagement region 96. As discussed above, the engagement region 96 may include a maximum or selected dimension 396 that the fingers, or at least an end 424 of the fingers may pass and snap over the engagement region 96. Thus, the handle assembly 24 may be coupled to the head assembly 28 by engagement or coupling of the finger assembly 232 to the fitment assembly or portion 88.

In the engaged and/or receiving configuration, as illustrated in FIGS. 19 and 20, the fingers 324 of the finger assembly 232 may be at least partially supported by the engagement surface 336 of the engaging end 46. This may provide at least some and/or additional structural support for the fingers 324 when a user is cleaning in a fixed or wobble position, as discussed herein. Thus, the finger assembly 232, including the fingers 324, may be supported at least in part by the surface 336 that may be formed or supported at least in part by the wall portions 50*a*, 50*b* of the handle 24.

As illustrated in FIGS. 19 and 20, the mechanism 80 may generally be biased in the receiving or accepting position as illustrated in FIGS. 19 and 20 when the control 40 is generally in the receiving position. The receiving position of the control 40 may be in a middle or receiving position 429, as illustrated in FIG. 20. The control member 40 when in the receiving position 429 allows for the handle assembly 24 to be held in the receiving biased position by the bias member 220. The control member 40, however, may be moved generally in the direction of arrow 190*b* to an ejecting or releasing position 434 where the control member 40 overcomes the bias force of the biasing member 220. Further, the control member 40 may move to a swivel, wobble, loose, or variable coupling position by moving the control member 40 generally in the direction of arrow 190*a* to a wobble position 438. The wobble position 438 may move the rod 160 generally in the direction of arrow 190*a* to overcome the biasing force of the biasing member 200. As discussed further herein, therefore, the control mechanism 80 may be operated with the control member 40 to operate the mechanism 80 of the handle assembly 24 into a selected configuration, such as in a fixed or receiving configuration, an ejection configuration, or a wobble configuration.

With continuing reference to FIG. 20, when the control member 40 is in the receiving position 429, the head assembly 28 may be coupled to the finger assembly 232 and held in a substantially fixed position relative to the handle 24. In the fixed or receiving position, the pin 250 may also be held in the fixed position as illustrated in FIG. 20. The pin 250 includes the tip portion 254 that may engage or be engaged in the depression, blind bore, or hollow 260 of the engaging portion 96. When the tip 254 of the pin 250 is held within the engaging hollow 260, the fitment 88 is substantially fixed relative to the handle assembly 24. For example, the handle assembly 24 may define an axis or geometry 430. The axis 430 may extend through the pin 250 including the tip portion 254. When the tip portion 254 is fixed within the hollow 260 of the fitment 88, the head assembly 28 is generally fixed relative to the axis 430. Thus, the head assembly 28 is substantially fixed relative to the engagement region 46 of the handle assembly 24 and generally is held with a selected force that may be based upon the biasing member 220, in a selected material of the fitment 88 and/or the pin 250, or other selected configurations. In the fixed configuration, the head 28 is generally held aligned with the axis 430 within a range of less than about 0.1° to about 2°. Regardless, in the fixed configuration as illustrated in FIG. 20, when the control member is generally in the fixed or receiving position 429, the pin portion 250 is held or positioned within the fitment 88 to hold the head assembly 28 relative to the handle assembly 24.

Figure 21:
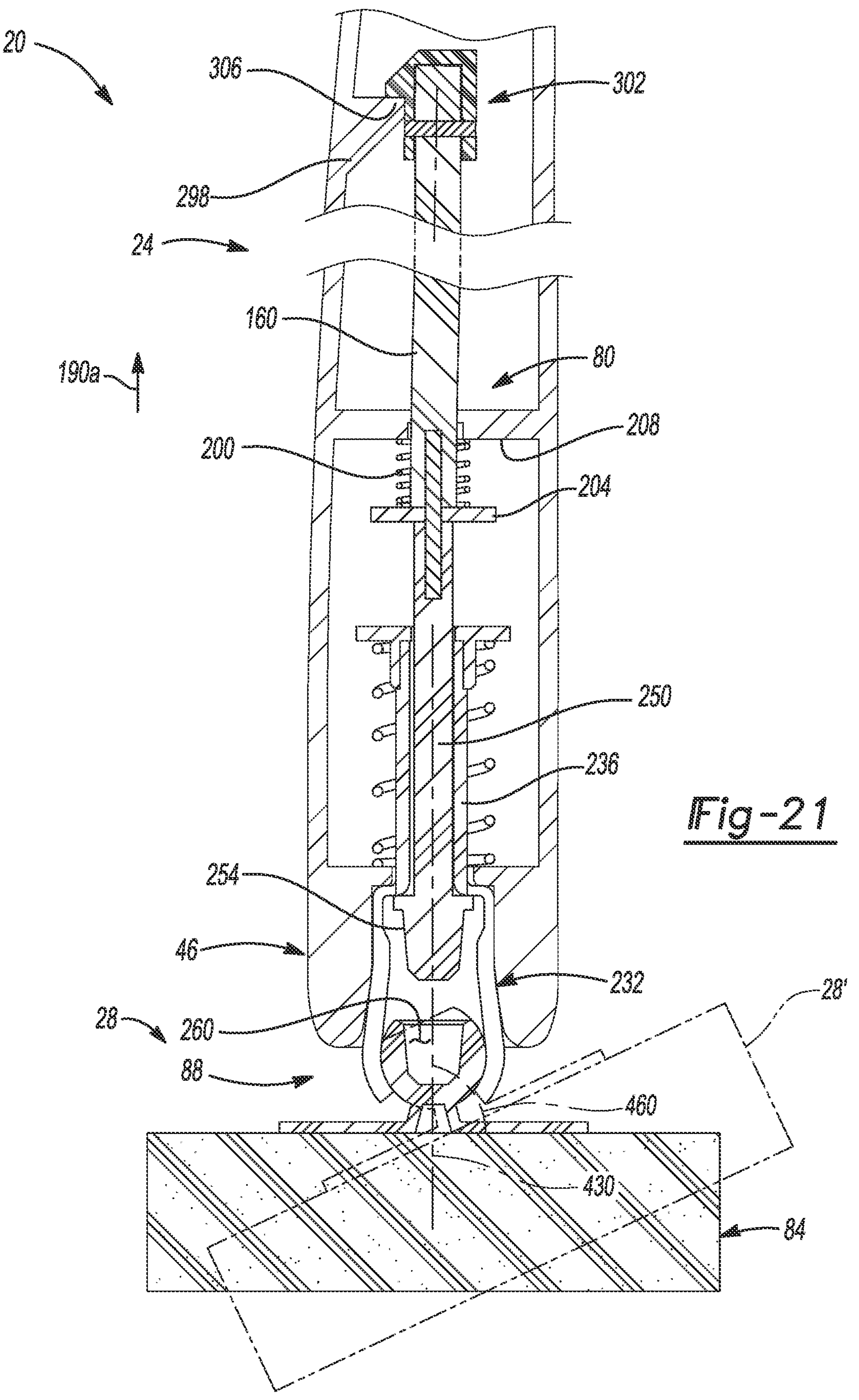
FIG. 21 is a detail cross-section view of the handle assembly taken along line 21-21 of FIG. 6, according to various embodiments, in a coupled and loose configuration.

Turning reference to FIG. 21, as discussed above, the control member 40 may be moved to the wobble position 438. In the wobble position 438, the control member 40 is moved generally in the direction of the arrow 190*a*. The movement of the control member 40 in the direction of the arrow 190*a* moves the mechanism 80. The mechanism 80 moves the rod 160 to overcome the biasing force of the biasing member 200. The biasing member 200, therefore, may be compressed between the flange or washer 204 that is fixed to the rod 160 and the internal support or wall portion 208. The biasing member 200, therefore, may be compressed as the biasing force is overcome by movement of the control member 40 moves the rod 160. The movement of the rod 160 in turn, moves additional portions of the mechanism 80.

The movement of the rod 160 generally in the direction of the arrow 190*a* moves the pin 250 away from the engagement portion 260. Therefore, the tip 254 may be removed from the bore or depression 260 of the fitment 88. By removing the tip 254 out of the depression 260, the head assembly 28 may move relative to the axis 430. As discussed above, the tip 254 may be engaged in the depression 260 to hold the head assembly 28 generally fixed relative to the axis 430. Removal of the tip 254 from the depression 260 may allow the engagement portion 96 of the fitment 88 to move within the socket configuration formed by the finger assembly 232, including the fingers 324. As discussed above, the fingers 324 may include an internal curve that may mate with the external curve surface 380 of the engagement portion 96. The two curved surfaces may allow for movement as the engagement portion 96 that moves within the socket portion defined by the fingers 324 such as a ball and socket joint.

In the wobble or loose configuration and/or interaction, the finger assembly 232 may have a swivel, wobble, or loose configuration relative to the coupling portion 96 and/or allow the head assembly 28 to wobble relative to the finger assembly 232 and/or the wall 50 of the handle assembly 24. Although the head assembly 28 may swivel or wobble in relation to the finger assembly 232, the fitment 88 will not be released until the control member 40 is in the ejection configuration. Even with the application of force to the head assembly 28 during vigorous cleaning and scrubbing of a toilet bowl, the head assembly in the fixed configuration or the wobble configuration may not be inadvertently released. As illustrated in FIG. 21, for example, the head assembly 28 may move to a wobble or tilted position shown in phantom 28'. The wobble position may be at an angle 460 relative to the axis 430. The angle 460 may be about 1° to about 90°, and further include about 5° to about 30°, and further include about 20°.

When in the wobble position, as illustrated in FIG. 21, the fingers are still in the engaged and/or receiving configuration, as illustrated in FIGS. 19 and 20. Thus, the fingers 324 of the finger assembly 232 may be at least partially supported by the engagement surface 336 of the engaging end 46. This may provide at least some and/or additional structural support for the fingers 324 when a user is cleaning in the fixed or wobble position. Thus, the finger assembly 232, including the fingers 324, may be supported at least in part by the surface 336 that may be formed or supported at least in part by the wall portions 50*a*, 50*b* of the handle 24.

As the finger assembly 232 may loosely engage the coupling portion 96, it is understood that the head portion 28 may rotate substantially 360° around the axis 430 of the handle assembly 24. Thus, the angle 460 may be achieved at any rotational angle relative to the axis 430 as well. The head assembly 28, therefore, in the swivel or wobble configuration, may therefore move relative to the handle assembly 24 for various purposes. This will allow the head 298 to swivel or wobble relative to the handle 24. For example, the wobble of the head assembly 28 may allow for ease of access to various cleaning surfaces, such as below the rim of a toilet bowl.

The mechanism 80, in moving the rod 160, may move the distal engaging end or member 302 also in the direction of arrow 190*a*. The engaging member 302 includes the engaging surface or finger 306, as discussed above. Due to the movement of the rod 160, therefore, the engagement surface 306 may engage the projection 298 from the wall 50. As discussed above, the rod 160 may be substantially straight while the wall 50 may include a selected curve or arc. Therefore, as the rod 160 moves in the direction of the arrow 190*a* the rod 160 may act as a biasing member to bias the engagement member 302 relative to the projection 298. Thus, as the engagement portion 302 moves past the projection 298 in the direction of arrow 190*a*, the engagement portion 302 may be biased toward and engage the projection 298 such that the finger 306 engages the projection 298. The rod 160, therefore, may act as a biasing member to bias the holding member 302 relative to the projection 298 when the control member is moved in the direction of 190*a* to the wobble position 438.

It is understood that the position of the engagement member 302 relative to the control member 40 may be selected based upon a length of the handle assembly 24, material of the rod 160 and its selected compliance or deformability, or other selected factors. Nevertheless, the rod 160 may act as a biasing member to bias the stopping portion 302 relative to the projection 298 to hold the mechanism 80 in the wobble configuration, as illustrated in FIG. 21.

Accordingly, the cleaning assembly 20 may include at least two configurations, such as two cleaning configurations, as discussed above. The fixed configuration as illustrated in FIG. 20 and the wobble configuration as illustrated in FIG. 21. The two configurations may allow for different use configurations and interactions and allow for the cleaning assembly 20 to include a plurality of configurations for use of the cleaning assembly.

The cleaning assembly 20 may also allow for removal of the head assembly 28 from the handle assembly 24. As discussed above, the handle assembly may be reused a plurality of times while the head assembly 28 may be recycled, refurbished, or discarded after a selected number of uses. The control member 40 may be moved to a removal position 434, as illustrated in FIG. 20. The removal position 434 moves the mechanism 80 generally in the direction of arrow 190*b*. The mechanism 80 is moved in the direction of the arrow 190*b* by moving the rod 160 to which the control 40 is connected.

The movement of the rod in the direction of 190*b* compresses the biasing member 220 between the washer or wall portion 228 of the finger assembly 232 and the end wall or surface 224. The movement to overcome the biasing force of the biasing member 220, in compressing, for example, the biasing member 220 moves the rod 160 generally toward the engagement end 46 of the handle assembly 24 in the direction of the arrow 190*b*. The movement of the rod 160 further moves the finger assembly 232 out of the engagement end 46 such that the fingers 324 are generally no longer engaged on or with the engagement surface 336 of the engaging end 46. The fingers 324, when not engaged, may generally expand such as radially away from the central axis 430 (e.g. defined by the pin member 250) generally in the direction of arrow 480. As the fingers 324 move away from the central axis 430 they decouple and disengage the fitment 88, including the engaging portion 96 thereof.

As the fingers 324 decouple from the engagement portion 96, the head assembly 28 may move away and/or drop away from the handle assembly 24. Further the pin number 250 may further push or apply an axial force to the bore 260 generally in the direction of arrow 190*b*. The additional force of the pin member 250 may further assist in removing the head assembly 28 from the mechanism 80 and the handle assembly 24. It is understood that the head assembly 28 may be removed from the finger assembly 232 by gravity or other external force and that the pushing or force applied by the pin 250 is not necessary. It is understood, that the pin assembly 250 may apply a force to the fitment 88 to assist in removing the head assembly 28 from the handle assembly 24.

Figure 22:
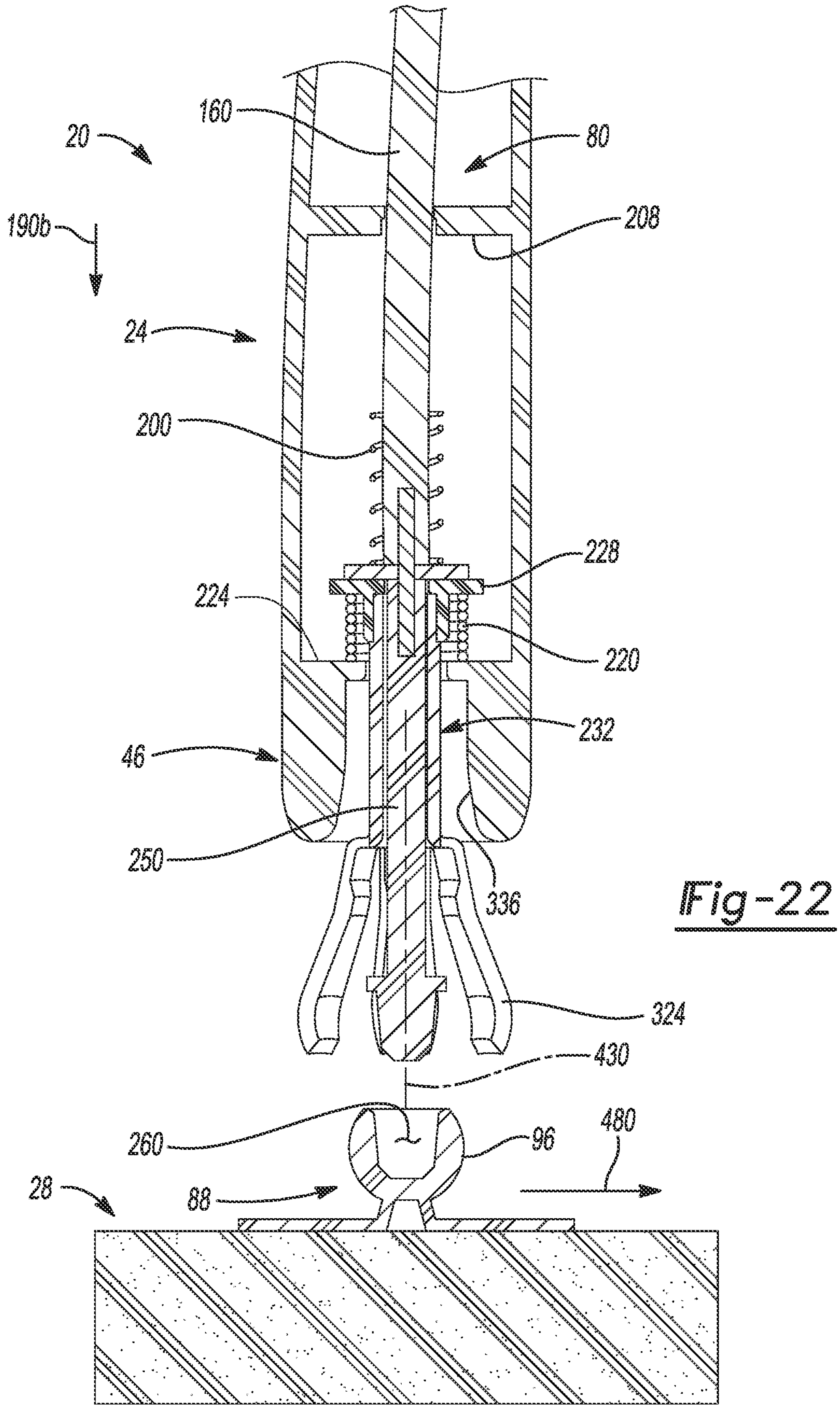
FIG. 22 is a detail cross-section view of the handle assembly taken along line 22-22 of FIG. 6, according to various embodiments, in a releasing configuration.
Figure 23:
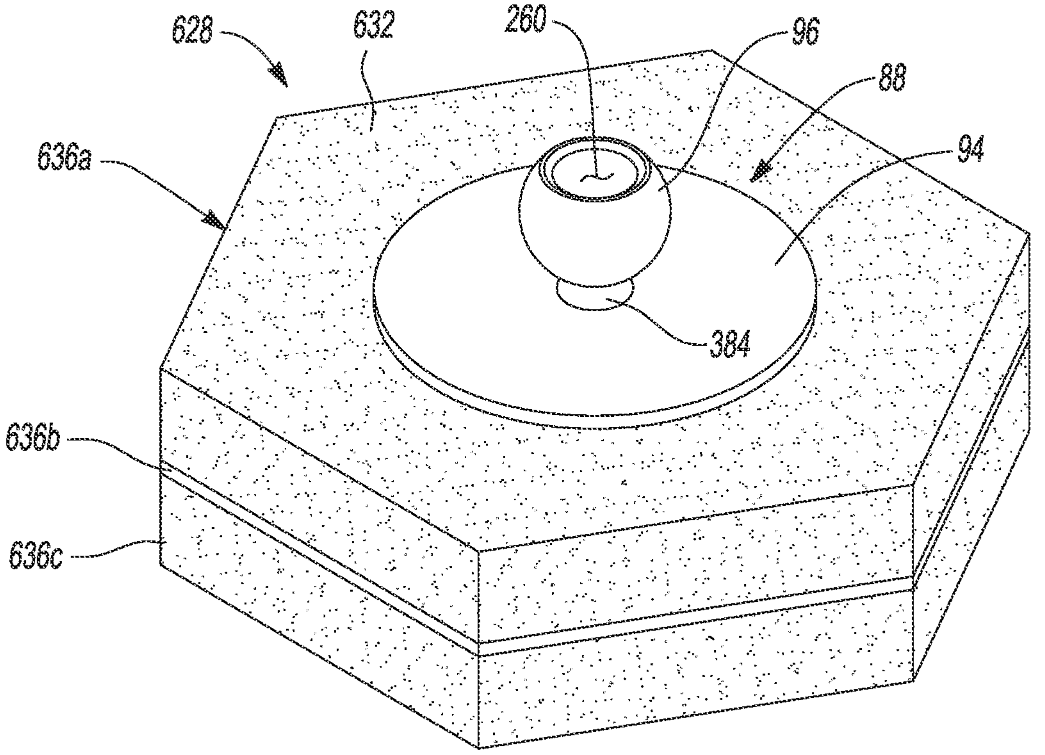
FIG. 23 is a top perspective view of a head assembly, according to various embodiments.

The handle assembly 24, after removal of the head assembly 28, may then return to the resting or ready position, as illustrated in FIG. 19. In the ready or resting position the biasing member 220 may bias the finger assembly 232 within the engaging end 46, such that the fingers 324 engage the wall 336. Thus, the handle assembly 24 may be made ready to receive and couple with a head assembly 28 automatically with the selected biasing members 200, 220, and/or 160. Further, the biasing member 200 may bias the mechanism 80 away from the wall 208 to assist in maintaining the holding member 302 in a disengaged position relative to the engaging or projection member 298. As discussed above, the handle assembly 24 may include at least the three positions or configurations including the ready position, which may be a head fixing position as illustrated in FIGS. 19 and 20. The handle assembly may further include the wobble position, as illustrated in FIG. 21. Further, the handle assembly 24 may include the disengaging position or decoupling position in configuration, as illustrated in FIG. 22.

Accordingly the cleaning assembly 20 may be provided with the head assembly 28 that can be coupled or engaged to the handle assembly 24 in one of a plurality of selected manners for various uses. The head assembly may be coupled for a fixed configuration relative to the handle assembly 24 to provide an appropriate or selected amount of force or rigidity relative to the handle assembly 24 for various cleaning and/or other purposes. Further, the head assembly 28 may be provided in the wobble position relative to the handle assembly 24 to allow for selected or additional mobility or configurations of the head 28 relative to the handle assembly 24, such as under an edge or lip of a toilet bowl. Further the handle assembly 24 may be provided in a disengaging or decoupling configuration to allow for ease of removal of the head assembly 28 from the handle assembly 24.

In various embodiments and/or in additional portions of various embodiments, the handle assembly 24 may be provided as multiple pieces along its length. For example, the grasping portion 60 may be provided to decouple from the second portion 44, such as generally at a decoupling or separating position that may be formed in a region 500 of the handle 24, as illustrated in FIG. 1. In various embodiments, therefore, the elongated or non-grasping portion 44 may include substantially all of the control mechanism or mechanism 80 for operation of the engagement or coupling portion relative to the head assembly 28. The grasping portion 80 may be removed from the second handle portion to allow for a shortened packaging or shipping assembly. The grasping portion 60 may generally provide additional length to the handle assembly 24, but may not include the mechanism 80 or a portion of the mechanism 80. Thus, removal of the grasping portion 60 from the rod or handle portion 44 may allow for ease of disassembly or separation for transport and ease assembly by a user prior to use of the cleaning assembly 20.

Accordingly, it is understood that the cleaning assembly 20 may include the handle assembly 24 formed as a single member, such as with an elongated wall 50 and/or with a wall 50 that is separated along its length that may be assembled to provide a usable or use length of the handle assembly 24 by a final user. When making the handle/wand 24 as two pieces certain changes or variations may occur. For example, additional material may be added to the wand 24 at or near the separation region 500 to assist and/or ensure a solid and firm feeling connection. Further, the wand 24 may be straight and/or lack a curve at that separation region 500.

In various embodiments, as illustrated in FIGS. 23, 24, 28, 26, 27, and 28 a head assembly 628 is illustrated. The head assembly 628 may include portions that are similar to the head assembly 28, as discussed above. For example, the head assembly 628 may include the fitment 88 that may be fixed to a selected surface, such as a top surface, 632 of the head assembly 628. The fitment 88 may include the same fitment portions, as discussed above. For example, the fitment 88 may include the flange or collar 94 and the engaging or coupling portion 96. The coupling portion 96 may be positioned relative to the flange 94 with the stem or neck 384 and may further include or define the depression or engaging bore 260. Accordingly, the fitment 88 may include the similar dimensions and portions as discussed above.

The fitment 88 may be sized to interconnect with the surface 632 of the substrate 636 of the head assembly 628. Generally, the fitment 88 may be connected to the substrate 636 in a manner substantially similar to that as discussed above to allow the head assembly 628 to operate with the handle assembly 24 in the cleaning assembly 20 similar to the head assembly 28.

The head assembly 28 may include the substrate 636 as a single unitary member and/or a plurality of portions including a first substrate portion 636*a*, a second substrate portion 636*b*, and a third substrate portion 636*c*. The three substrate portions 636*a*, 636*b*, and 636*c* may be formed together in a selected manner. The different substrate portions may include different materials and/or compounds. For example the second substrate portion 636*b* may include a cleaning compound loaded thereon. It is understood that head assemblies according to any of the various embodiments may include a plurality of layers of substrate, as illustrated here.

Figure 26:
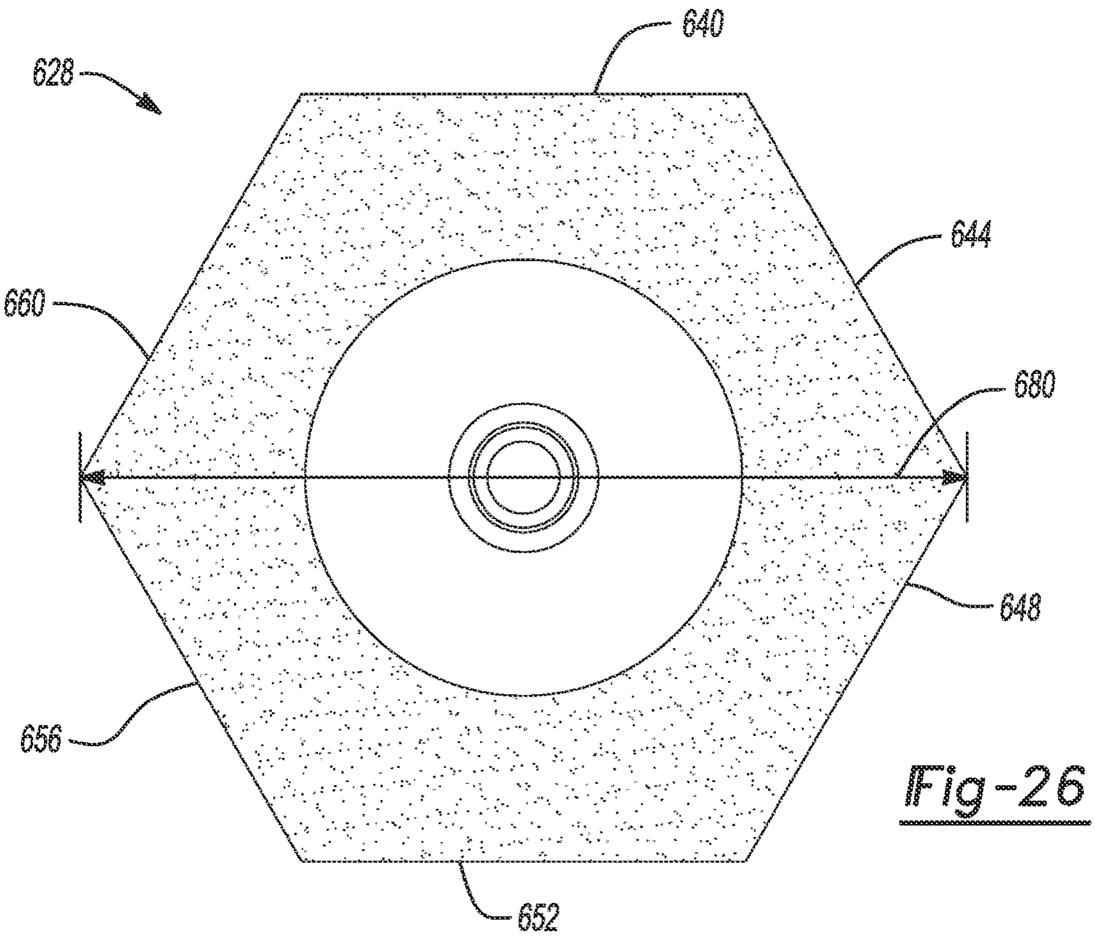
FIG. 26 is a top plan view of the head assembly of FIG. 23.
Figure 27:
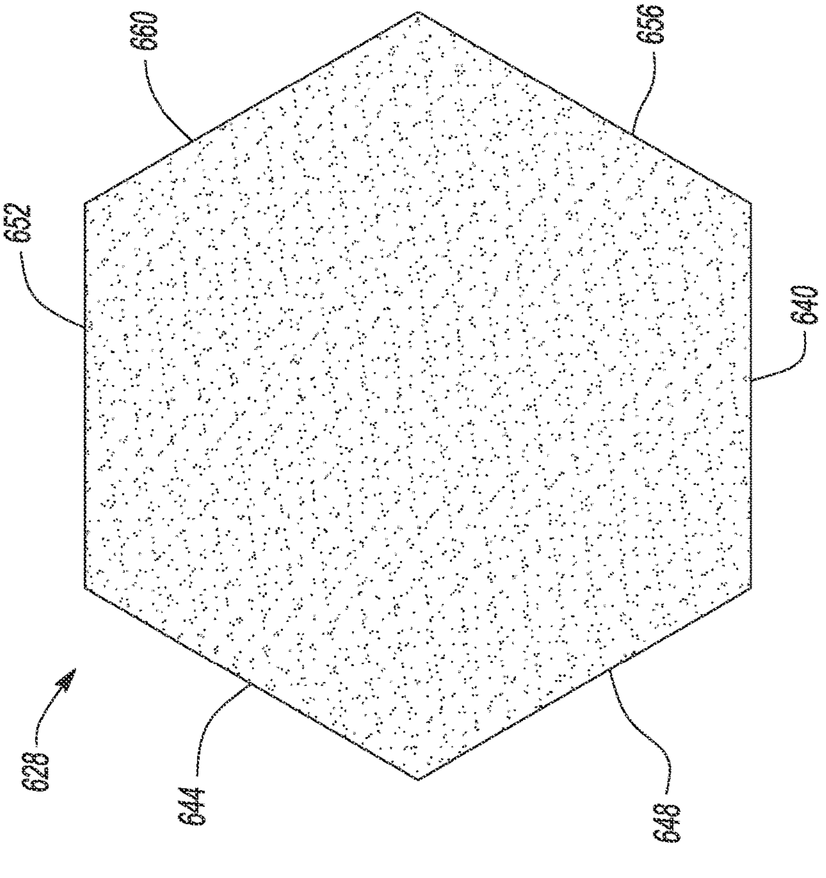
FIG. 27 is a bottom plan view of the head assembly of FIG. 23.

Further, the head assembly 628 may include a selected polygon configuration, such as a hexagon polygon configuration. As illustrated in FIGS. 26 and 27, the head assembly 628 may include six sides such as a first side 640, a second side 644, a third side 648, a fourth 652, a fifth side 656, and a sixth side 660. The hexagon shape including the six sides is 640-660 may form an exterior perimeter of the head assembly 628. The sides 640-660 may be substantially flat over a height 664 of the head assembly 628.

The sides may all have an equal dimension such as a dimension 668 that extends between the two adjacent vertices, such as a vertex 672 and a vertex 676 of the side 640. The height 664 may be a height similar to the height 122, as discussed above including about 0.5 cm to about 10 cm, including about 0.5 cm to about 5 cm, and further including about 1.2 cm to about 3 cm. The dimension 668 may be about 2 cm to about 13 cm, including about 2 cm to about 5 cm, and further including about 3.5 cm to about 4 cm.

The head assembly 628 may include a maximum dimension 680 between opposing vertices of the head assembly 628. The dimension 680 may be similar to the dimension 114 as discussed above including about 5 cm to about 25 cm, including about 5 cm to about 10 cm, and further including about 7 cm to about 8 cm. Accordingly, the head assembly 628 may include the maximum dimension 680 that is substantially identical to or similar to the diameter or maximum dimension 114 of the head assembly 28. This may also allow the head assembly 628 to be packaged in a dimension similar or identical to the head assembly 28.

Figure 28:
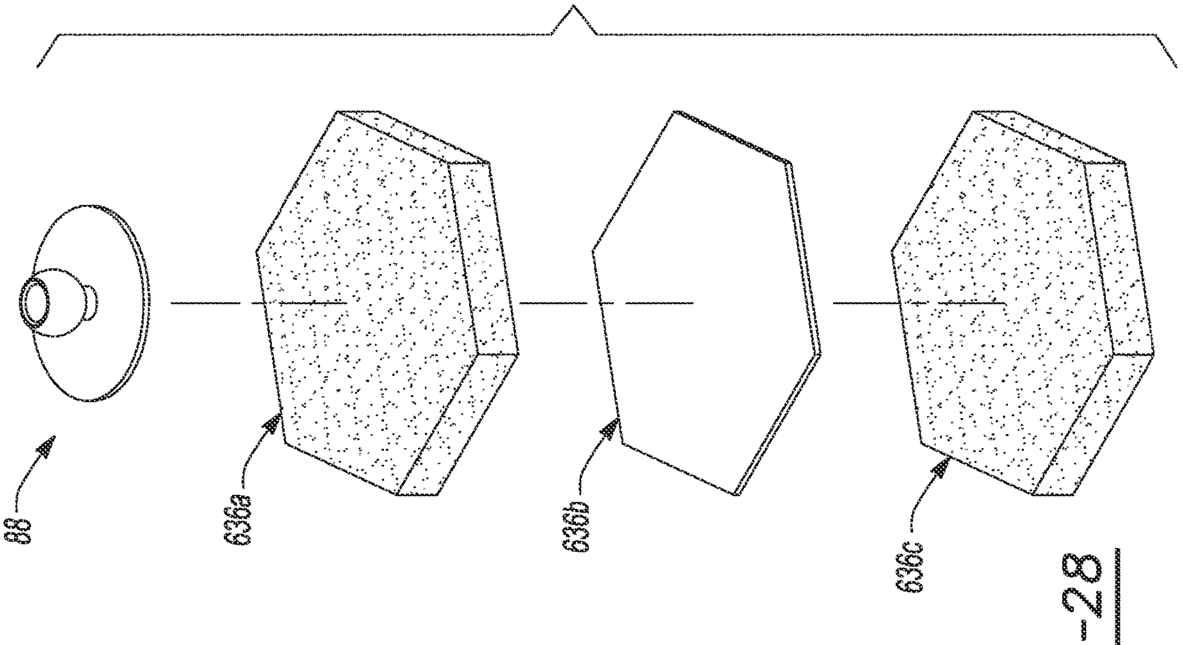
FIG. 28 is an exploded view of the head assembly of FIG. 23.

The head assembly 628 may include various portions that may be fixed together, as illustrated in FIG. 28. The various portions may include the fitment 88, the substrate layer 636*a*, the substrate layer 636*b*, and the substrate layer 636*c*. Each of the layers may be adhered together, such as with selected adhesives or other appropriate materials. Further, the substrate may be over molded onto the fitment 88 of the selected embodiment. Each of the three layers may be form separately and unified into a single member during a selected production process. Nevertheless, it is understood that the substrate 636 may also be formed as a single unitary member that may be formed in the selected shape and/or loaded with a selected material.

Figure 24:
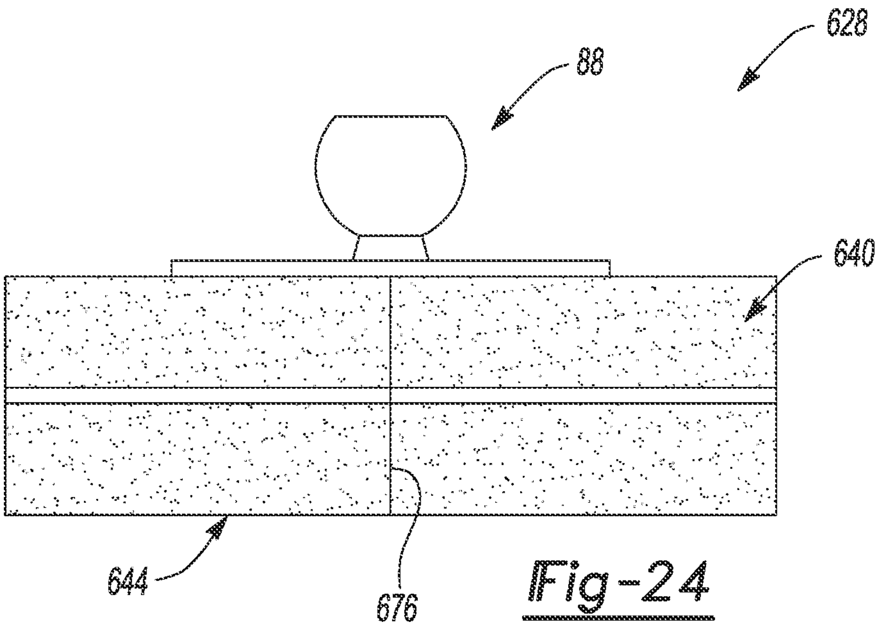
FIG. 24 is a first side view of the head assembly of FIG. 23.
Figure 25:
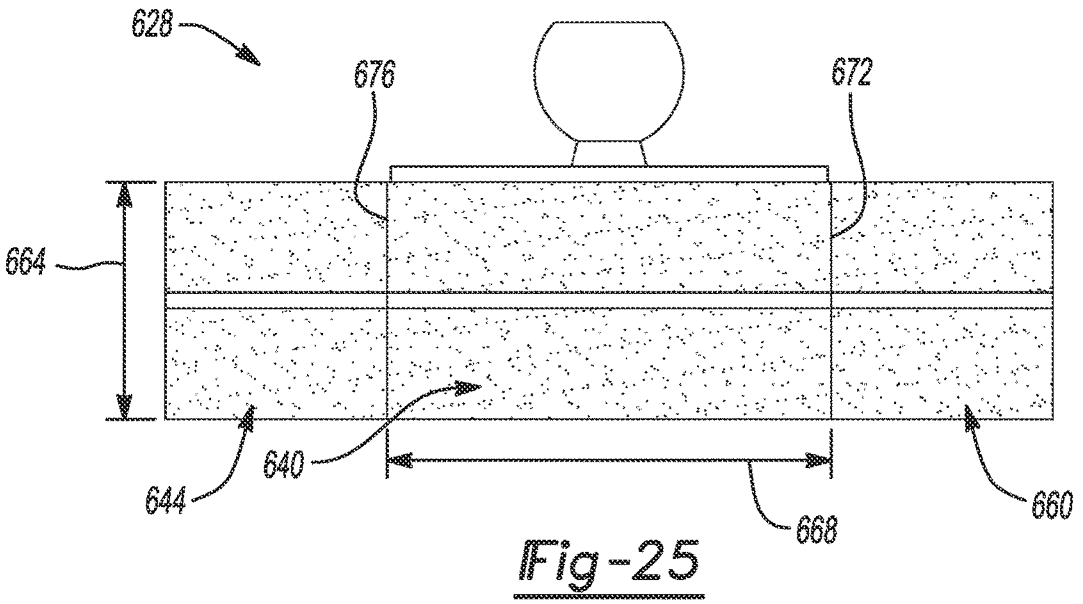
FIG. 25 is a second side view of the head assembly of FIG. 23.

As illustrated in the figures, the regular polygon shape of the head assembly 628 may allow the views from sides of the head assembly to be substantially identical when looking at either a face, as illustrated in FIG. 25, or a vertex 676, as illustrated in FIG. 24. It is understood, however, that the shape of the head assembly 628 may be a non-regular polygon such that one or more of the sides, such as the side 644, may have a dimension greater than the other sides. Further, it is understood that the head assembly 628 may include other polygon shapes such as pentagons, octagons, or the like. The hexagonal polygon is merely exemplary of a polygon shape of which the substrate 636 may be formed. Nevertheless the head assembly 628 may be connected with the handle assembly 24 to form the cleaning assembly 20 as discussed above.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

What is claimed is:

1. A cleaning tool comprising:

a. a cleaning head assembly comprising:

i. a fitment including a base having an engaging surface and a coupling portion, wherein the coupling portion includes an exterior curved surface structure extending from a neck and wherein the neck extends from the base; and ii. a cleaning substrate having a first surface and a second surface, wherein the second surface is opposed to the first surface and wherein the first surface is configured to be secured to the engaging surface;

b. an elongated handle assembly, comprising:

i. a coupling mechanism including a plurality of fingers operable to be positioned at and/or between an expanded configuration and a contracted configuration; and ii. a control mechanism that controls the plurality of fingers between the expanded configuration and the contracted configuration; and wherein the plurality of fingers couple to the fitment to couple the cleaning head assembly to the elongated handle assembly at least in the contracted configuration;

wherein the handle assembly further comprises:

an exterior wall;

wherein the control mechanism is moveable relative to the exterior wall to at least:

a first position to configure the plurality of fingers in the expanded configuration to release the fitment from the exterior wall, a second position to configure the plurality of fingers in the contracted configuration and loosely retain the fitment relative to the exterior wall; and a third position to lock the fitment relative to the exterior wall.

2. The cleaning tool of claim 1, wherein the fitment is rotationally attached to the elongated handle by the plurality of expandable fingers in the contracted configuration.

3. The cleaning tool of claim 1, wherein the control mechanism comprises:

a control member engageable by a user; and a moveable member moveable by the control member;

wherein the moveable member is configured to position the plurality of fingers at and/or between the expanded configuration and the contracted configuration.

4. The cleaning tool of claim 3, wherein the moveable member comprises a pin configured to engage and lock the fitment relative to the exterior wall.

5. The cleaning tool of claim 1, wherein the exterior wall includes an internal surface configured to engage the plurality of fingers at the contracted configuration.

6. The cleaning tool of claim 5, wherein the control mechanism further comprises a biasing member to bias the control mechanism to move the fingers to engage the internal surface.

7. The cleaning tool of claim 1, further comprising:

an internally extending surface;

wherein the control mechanism further comprises a holding portion;

wherein the holding portion is operable to engage the internally extending surface to hold the control mechanism in the first position to configure the plurality of fingers in the expanded configuration to release the fitment from the exterior wall.

8. The cleaning tool of claim 1, wherein the exterior curved surface structure of the coupling portion is at least partially spherical;

wherein the plurality of fingers in the contracted configuration define at least a portion of a socket;

wherein the coupling portion is operable to be positioned into the socket and swivel relative to a portion of the socket and the elongated handle.

9. The cleaning tool of claim 1, wherein the plurality of fingers extend from an end wall of the elongated handle in both the expanded configuration and the contracted configuration.

10. A cleaning tool comprising:

a. a cleaning head assembly comprising:

i. a fitment having an engaging surface and a coupling portion wherein the coupling portion includes an exterior curved surface structure extending from a neck and wherein the neck extends from a base; and ii. a cleaning substrate having a first surface and a second surface, wherein the first surface is secured to the engaging surface;

b. an elongated handle assembly, comprising:

i. a coupling mechanism including a plurality of fingers operable to be positioned at and/or between an expanded configuration and a contracted configuration; and ii. a control mechanism that controls the plurality of fingers between the expanded configuration and the contracted configuration; and wherein the fitment is rotationally attached to the coupling mechanism; and wherein the coupling mechanism is operable to retain the cleaning head loosely so that the cleaning head is able to (1) rotate 360° around a center axis of the elongated handle assembly and (2) be positioned up to about 90° from the center axis of the elongated handle assembly.

11. The cleaning tool of claim 10, wherein the elongated handle assembly further comprises an elongated handle member;

wherein the control mechanism is moveable relative to the elongated handle member to at least:

a first position to configure the plurality of fingers in the expanded configuration to release the fitment;

a second position to configure the plurality of fingers in the contracted configuration that is operable to retain the cleaning head loosely; and a third position to lock the fitment relative to the elongated handle member.

12. The cleaning tool of claim 11, wherein the control mechanism further comprises a locking pin configured to engage the fitment when the control mechanism is in the third position and not engage the fitment in the second position.

13. The cleaning tool of claim 12, wherein the coupling portion further comprises:

a depression formed in the coupling portion;

wherein the locking pin engages the depression to lock the fitment relative to the handle member.

14. The cleaning tool of claim 11, wherein the plurality of fingers of the coupling mechanism forms a socket in the contracted configuration to moveably capture the coupling portion.

15. The cleaning tool of claim 14, wherein the exterior curved surface structure of the coupling portion forms at least a portion of a sphere, wherein the portion of the sphere is configured to be received within the socket.

16. A cleaning tool comprising:

a fitment having a coupling portion including a spherical portion extending from a neck and a base, wherein the spherical portion extends away from the base;

a cleaning substrate having a top surface and a bottom surface, wherein the substrate top surface is connected to the base; and a handle assembly comprising:

a coupling mechanism including a plurality of fingers operable to be positioned at and/or between an expanded configuration and a contracted configuration; and a control mechanism that controls the plurality of fingers between the expanded configuration and the contracted configuration;

wherein the plurality of fingers in the contracted configuration couples the coupling portion relative to the handle assembly;

wherein the spherical portion extends substantially perpendicular from the base and is configured to be coupled to the handle assembly in both a loose configuration and a fixed configuration;

wherein the spherical portion defines an internal depression configured to engage a pin to fix the base relative to the handle assembly.

17. The cleaning tool of claim 16, wherein the coupling mechanism further includes the pin;

wherein the control mechanism controls movement of the pin to engage or disengage the internal depression.

* * * * *